(12) United States Patent
Vaghetto et al.

(10) Patent No.: US 10,720,245 B1
(45) Date of Patent: Jul. 21, 2020

(54) THORIUM FUEL ROD STRUCTURE AND ASSEMBLY

(71) Applicant: Texas Thorium, LLC, Houston, TX (US)

(72) Inventors: Rodolfo Vaghetto, Miami, FL (US); Holloway H. Frost, Houston, TX (US); Yassin A. Hassan, College Station, TX (US); Lin Shao, College Station, TX (US); Trevor D. Parker, College Station, TX (US)

(73) Assignee: Texas Thorium, LLC, Houston, TX (US)

(*) Notice: Subject to any disclaimer, the term of this patent is extended or adjusted under 35 U.S.C. 154(b) by 0 days.

(21) Appl. No.: 16/554,734

(22) Filed: Aug. 29, 2019

Related U.S. Application Data

(63) Continuation of application No. 16/517,195, filed on Jul. 19, 2019, which is a continuation of application No. 16/517,096, filed on Jul. 19, 2019.

(51) Int. Cl.
  *G21C 3/04* (2006.01)
  *G21C 3/30* (2006.01)
  (Continued)

(52) U.S. Cl.
  CPC ............... *G21C 3/30* (2013.01); *G21C 3/04* (2013.01); *G21C 1/30* (2013.01); *G21C 3/58* (2013.01)

(58) Field of Classification Search
  CPC ... G21C 1/30; G21C 3/02; G21C 3/04; G21C 3/048; G21C 3/22; G21C 3/30; G21C 3/32; G21C 3/326
  See application file for complete search history.

(56) References Cited

U.S. PATENT DOCUMENTS 2,798,848 A * 7/1957 Kingdon ............... G21C 3/041
 376/418
3,022,240 A * 2/1962 Bassett .................. G21C 3/16
 376/423
(Continued)

FOREIGN PATENT DOCUMENTS

CN 207081348 U 3/2018

OTHER PUBLICATIONS

"The accelerator-driven Thorium reactor power station", Energy, vol. 164, Issue EN3 at 127-135 (Aug. 2011 Issue), Ashley, Coats, et. al.
(Continued)

*Primary Examiner* — Sharon M Davis
(74) *Attorney, Agent, or Firm* — McAughan Deaver PLLC

(57) ABSTRACT

A Thorium fuel rod assembly is disclosed that includes first and second support elements and a number of Thorium fuel rods positioned between support elements. Each of the Thorium fuel rod includes an outer fuel element containing a solid Thorium an inner core element containing Beryllium that is positioned within an interior cavity defined by the outer fuel element. In an exemplary disclosure, the inner core element also defines an inner cavity such that a beam of high energy particles may be directed into the inner cavity of the inner core element to impinge upon a Beryllium nucleus within the inner core element to produce a (p, n) reaction resulting in the emission of a neutron, where the emitted neutron may interact with a Thorium nucleus in the outer fuel element to cause the Thorium nucleus to fission.

7 Claims, 32 Drawing Sheets

(51) Int. Cl.
*G21C 1/30* (2006.01)
*G21C 3/58* (2006.01)

(56) References Cited

U.S. PATENT DOCUMENTS

| | | | |
|---|---|---|---|
| 3,170,842 A | | 2/1965 | Keher |
| 3,274,068 A | * | 9/1966 | Koutz ............... G21C 3/28 |
| | | | 376/423 |
| 3,291,696 A | * | 12/1966 | Sugimoto ............. G21C 3/04 |
| | | | 376/423 |
| 3,403,076 A | | 9/1968 | Bettis |
| 3,547,778 A | | 12/1970 | Flaherty et al. |
| 3,734,827 A | | 5/1973 | Schilling |
| 3,998,692 A | * | 12/1976 | Bohanan ............... G21C 1/08 |
| | | | 376/172 |
| 4,033,814 A | | 7/1977 | Bregeon et al. |
| 5,774,514 A | * | 6/1998 | Rubbia ............... G21C 1/00 |
| | | | 376/193 |
| 8,983,017 B2 | | 3/2015 | McIntyre et al. |
| 9,881,700 B2 | | 1/2018 | Leblanc |
| 2012/0183112 A1 | | 7/2012 | LeBlanc |

OTHER PUBLICATIONS

"Study of Multi-Beam Accelerator Driven Thorium Reactor", H. Ludewig and A. Aronson, Mar. 21, 2011.
"Development of a Simulation Tool for a Preliminary Analysis of the Msr Core Dynamics" Fiorina, et al., Proceedings of the International Conference Nuclear Energy for New Europe, Portorž, Slovenia, Sep. 6-9, 2010.
"Spray, Mist, Bubbles, and Foam in the Molten Salt Reactor Experiment", Engel, et al., Jun. 1970.
"Quality-Assurance Practices in Construction and Maintenance of the Molten-Salt Reactor Experiment", Webster, Apr. 1970.
"Accelerator driven systems: Energy generation and transmutation of nuclear waste", International Atomic Energy Agency, Nov. 1997.
"Accelerator Driven Systems for Thorium Utilisation in India", Degweker, et al., Oct. 27-31, 2013.
"Accelerators for Subcritical Molten-Salt Reactors", Bowman, et al., 2011.
"Accelerator and Target Technology for Accelerator Driven Transmutation and Energy Production", Abderrahim, et al., Sep. 17, 2010.
"An Energy Amplifier for Cleaner and Inexhaustible Nuclear Energy Production Driven by a Particle Beam Accelerator", Carminati, et al., Nov. 1, 1993.
"Argonne National Laboratories—Chemical Engineering Division Research Highlights", Vogel, et al., Jan.-Dec. 1969.
"Argonne National Laboratories—Chemical Engineering Division Annual Report—1968", Vogel, et al., Apr. 1969.
"Basics of accelerator driven subcritical reactors", Nifenecke, et al., 2001.
"The conceptual design of electron-accelerator-driven subcritical thorium molten salt system", Zuokang, et al., 2013.
"Designing and Implementing a Variable Energy Neutron System to Search for Conventional Explosives", Z. D. Whetstone, 2015.
"Fast Spectrum Molten Salt Reactor Options", Holcomb, et al., Jul. 2011.
"Fuel inventory characterization for fast spectrum molten salt reactors", M. Martin (UC Berkeley Nuclear Engineering) Sep. 11, 2017.
"Measurements of Fission Cross Sections for the Isotopes relevant to the Thorium Fuel Cycle", European Organization for Nuclear Research, Aug. 8, 2001.
"Molten-Salt Reactor Program Semiannual Progress Report", Program Director R. B. Briggs (Oak Ridge National Laboratory) Nov. 1964 (part 1 of 3).
"Molten-Salt Reactor Program Semiannual Progress Report", Program Director R. B. Briggs (Oak Ridge National Laboratory) Nov. 1964 (Part 2 of 3).
"Molten-Salt Reactor Program Semiannual Progress Report", Program Director R. B. Briggs (Oak Ridge National Laboratory) Nov. 1964 (Part 3 of 3).
"Molten salt reactors: A new beginning for an old idea", Leblanc, 2010.
"High Efficiency Nuclear Power Plants Using Liquid Fluoride Thorium Reactor Technology", Juhasz, et al., Oct. 2009.
"Neutron Production From Li(d,xn) Driven by High-Intensity Laser-Target Interactions", Petrov, et al., 2010.
"Nuclear power from thorium: different options", Banerjee, et al., Nov. 25, 2016.
"Once through thorium based fuel cycle analysis of accelerator driven system for energy production and radioactive waste transmutation—impact on economy improvement" (Relativistic Nuclear Physics & Quantum Chromodynamics), M. Szuta and A. Wojceichowski, Oct. 4-9, 2010.
"Nuclear Characteristics of Spheric Homogeneous, Two-Region, Molten-Fluoride-Salt Reactors" (Oak Ridge National Laboratory), Alexander, et al., Sep. 16, 1969.
"MSRE Design and Operations Report Part I Description of Reactor Design", Robertson, Jan. 1965 (Part 1 of 2).
"MSRE Design and Operations Report Part I Description of Reactor Design", Robertson, Jan. 1965 (Part 2 of 2).
"Processing of the MSRE Flush and Fuel Salts" Lindauert, Aug. 1969.
"Production and Applications of Neutrons Using Particle Accelerators", Chinchester, Nov. 2009.
"Reactors with Molten Salts: Options and Missions" (Oak Ridge National Laboratory), Forsberg, et al., Aug. 3, 2004.
"Molten Salt Chemistry Part—IV. Solubility Behaviour of PuF3 in Fluoride Salts of Interest in Molten Salt Reactor Technology" (Government of India Atomic Energy Commission), Vaidya, et al., 1976.
"Sub-critical Thorium reactors" Rubbia, Oct. 19-20, 2009.
"Target and shielding design of accelerator-driven transportable neutron source" Kushima, et al., 2017.
"The concept of Fast Spectrum Molten Salt Reactor (MSFR)", E. Merle-Lucotte, et al., Dec. 2013.
"The Molten Salt Fast Reactor as a Fast-Spectrum Candidate for Thorium Implementation", Carlo Fiorina,Mar. 2013.
"Thermal- and Fast-Spectrum Molten Salt Reactors for Actinide Burning and Fuel Production" (Oak Ridge National Laboratory), Forsberg, Sep. 9-13, 2007.
"Thick Lithium Metal Target for Fast Neutron Production", Kawade, et al., Aug. 1973.
"Use of Thorium in the Generation IV Molten Salt Reactors and Perspectives for Brazil" Seneda, et al., Nov. 24-29, 2013.
"Determination of Solubility Parameters of Ionic Liquids and Ionic Liquid/Solvent Mixtures from Intrinsic Viscosity", Weerachanchai, et al., 2014.
"Why the molten salt fast reactor (MSFR) is the "best" Gen Iv reactor", Siemer, 2015.
"Adopt coiled pipe heat exchanger for solar energy of fused salt heat transfer", Google translation of Chinese Patent CN207081348U, Mar. 9, 2018.
"Fluid Fuel Reactors", Lane, et.al., Sep. 1958 (Part 1 of 2).
"Fluid Fuel Reactors", Lane, et.al., Sep. 1958 (Part 2 of 2).
Abstract of "Accelerator-Driven Thorium Cycle: New Technology Makes It Feasible" Adams, et al., Jul. 1, 2002 for ICAPP'02 Conference held Jun. 9-13, 2002.
World Nuclear News article "Lightbridge fuel development gains DOE funding" found at http://world-nuclear-news.org/Articles/Lightbridge-fuel-development-gains-DOE-funding, May 30, 2019.
Venneri, "Accelerators address neuclear waste problems", Physics World 6, No. 8 (1993); 40, (Aug. 1993).
Furukawa, "A road map for the realization of global-scale thorium breeding fuel cycle by single molten-fluoride flow", Energy Conversion and Management, 49, No. 7 (2008); 1832-1848 (Mar. 2008).
Bak, "Neutron Analysis and Transmutation Performance in Th-based Molten Salt Fuels", In Thorium Energy for the World, pp. 375-377 Springer Cham (Apr. 2016).

(56) References Cited

OTHER PUBLICATIONS

Tak, "Computational fluid dynamics analysis of spallation target for experimental accelerator-driven transmutation system", Nuclear Engineering and Design 235, No. 7 (2005): 761-772.

Shea, "Design Considerations for the ESS Accelerator-to-target Region", in Particle Accelerator Conference: 300-302, 2013.

Suzuki, "A Study of Startup and Shutdown Procedures for Accelarator-Driven System", Nuclear Methods and Instruments in Physics Research Section A: Accelerators, Spectrometers, Detectors and Associated Equipment 562: 867-869 (Mar. 2006).

Pignatel, "Description of the European Helium-Cooled EFIT Plant: An Industrial-scale Accelerator-driven System for Minor Actinide Transmutation II", Nuclear Technology vol. 180: 264-296 (Nov. 2012).

Holcomb, "U.S. MSR Development Programs & Supportive Efforts", GIF MSR pSSC meeting Sydney, Australia, Mar. 12-15, 2019.

* cited by examiner

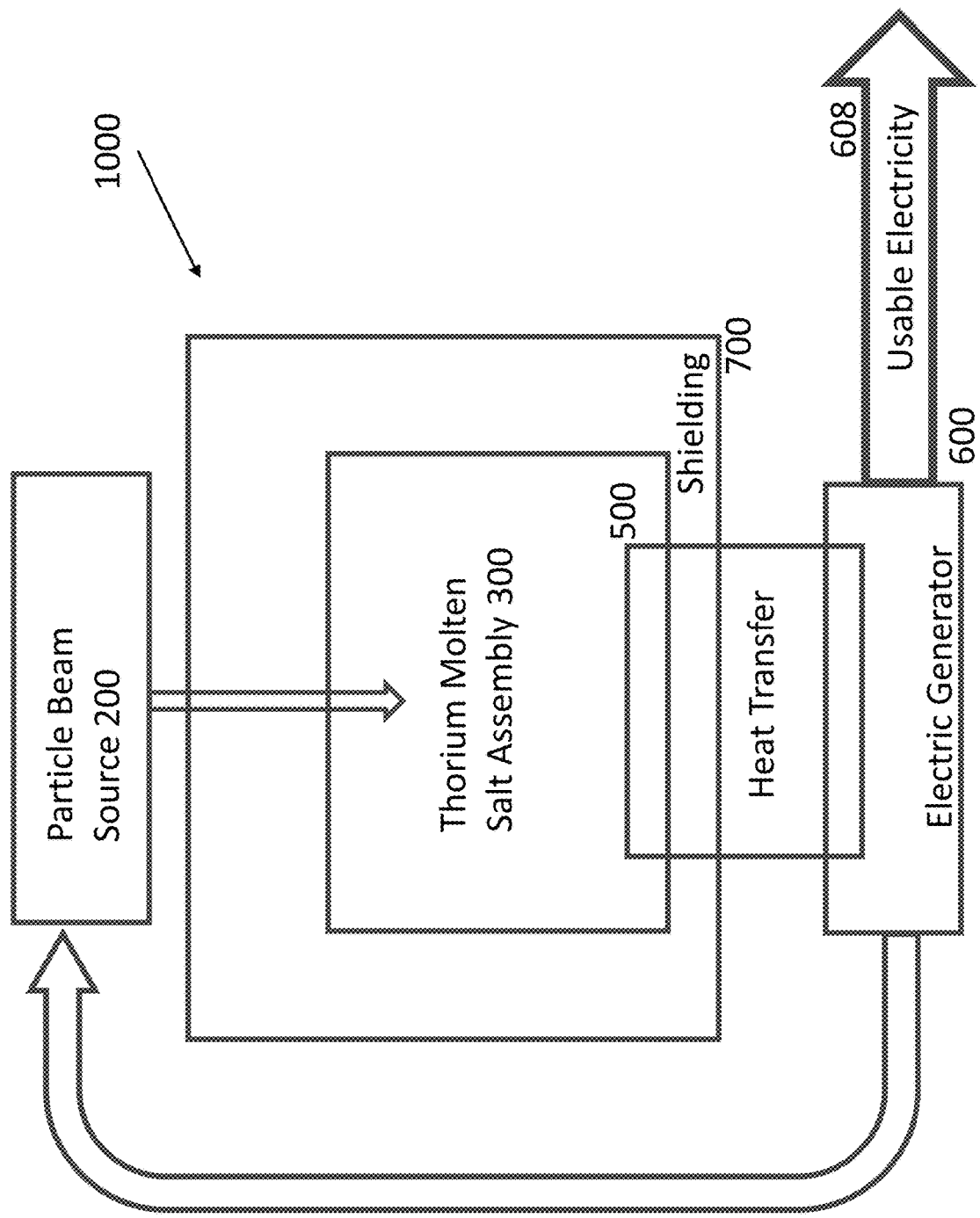

FIG. 2E2
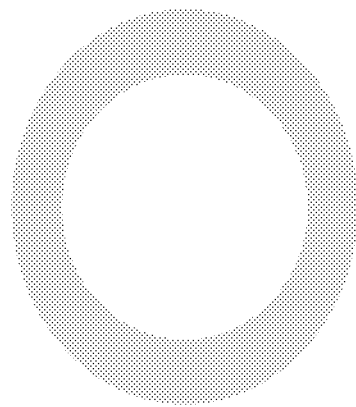
FIG. 2E4
FIG. 2E1
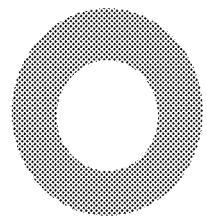
FIG. 2E3

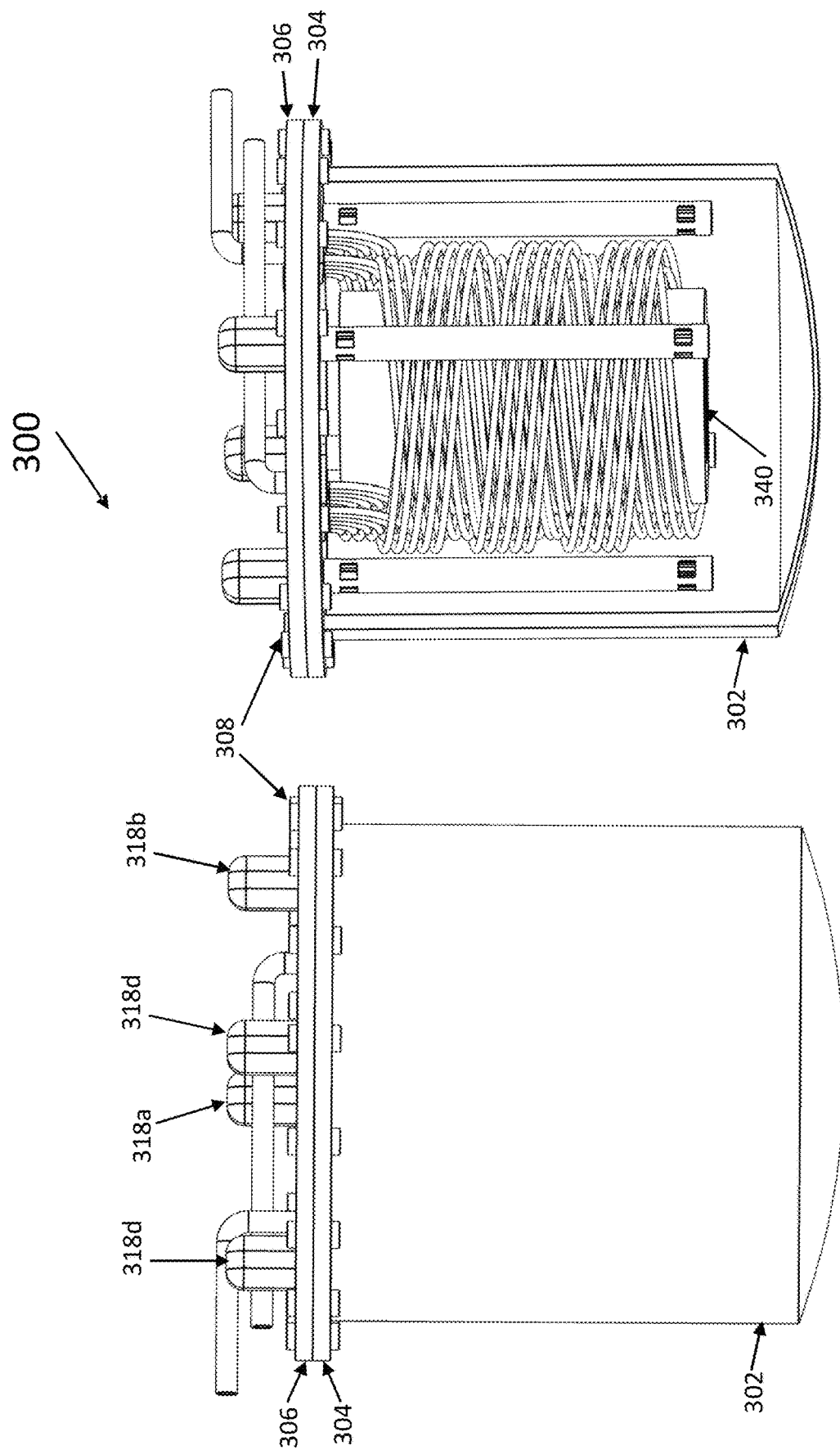

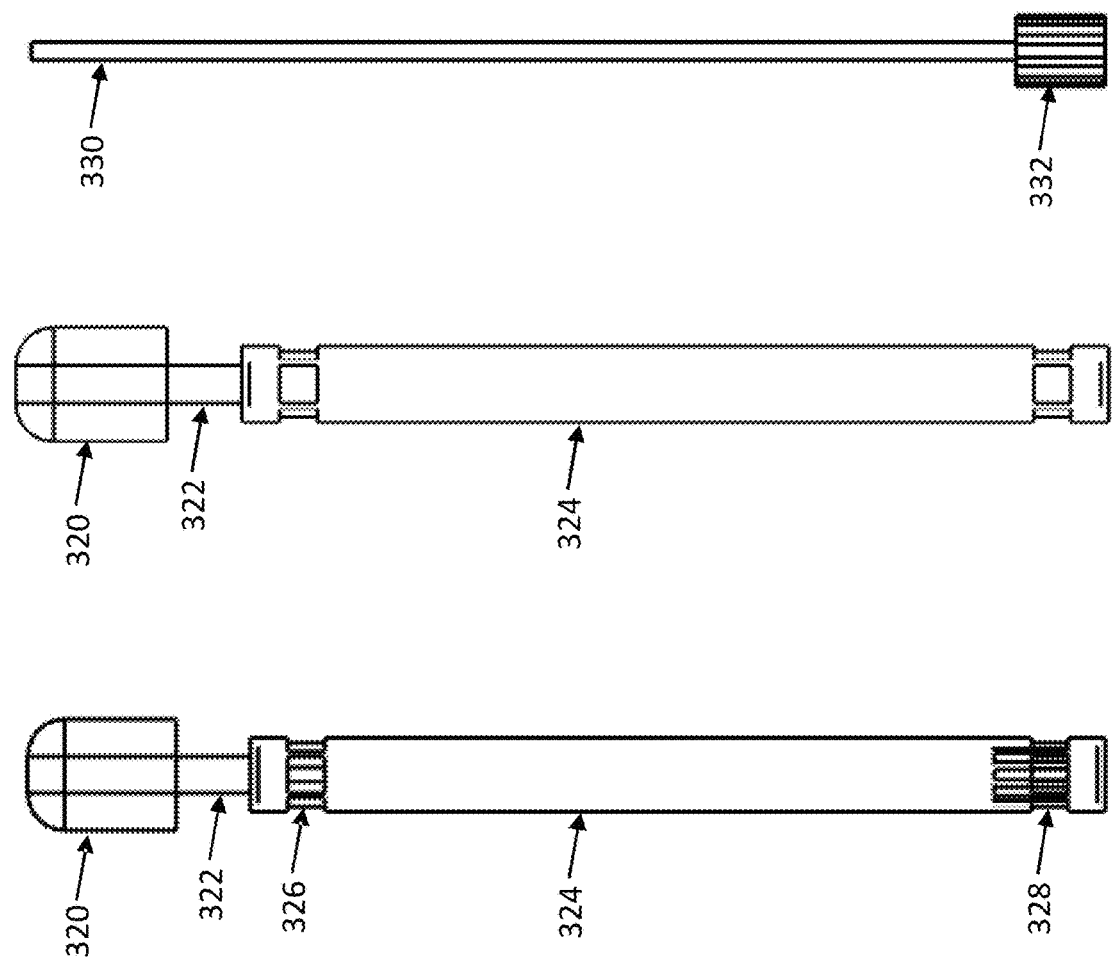

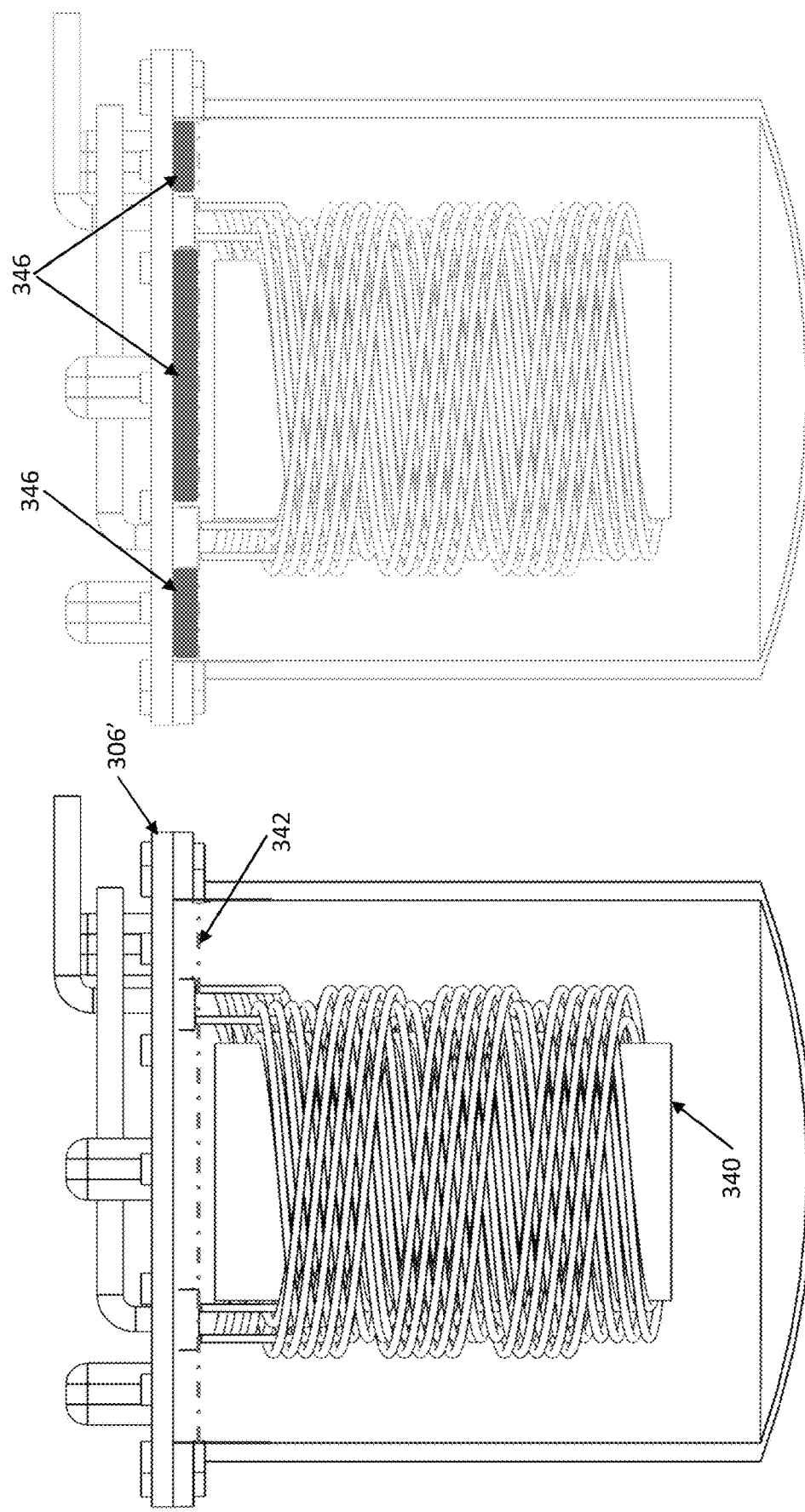

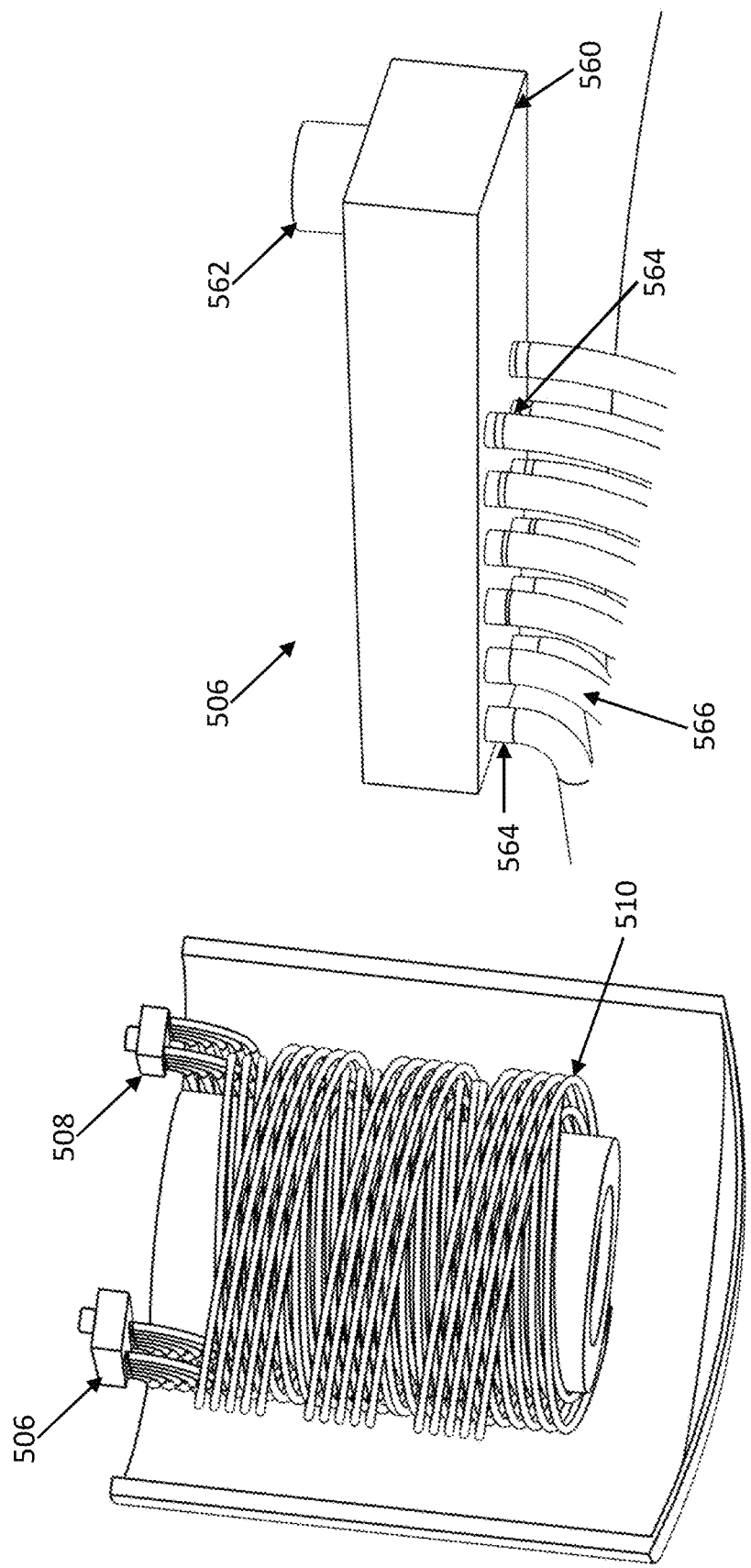

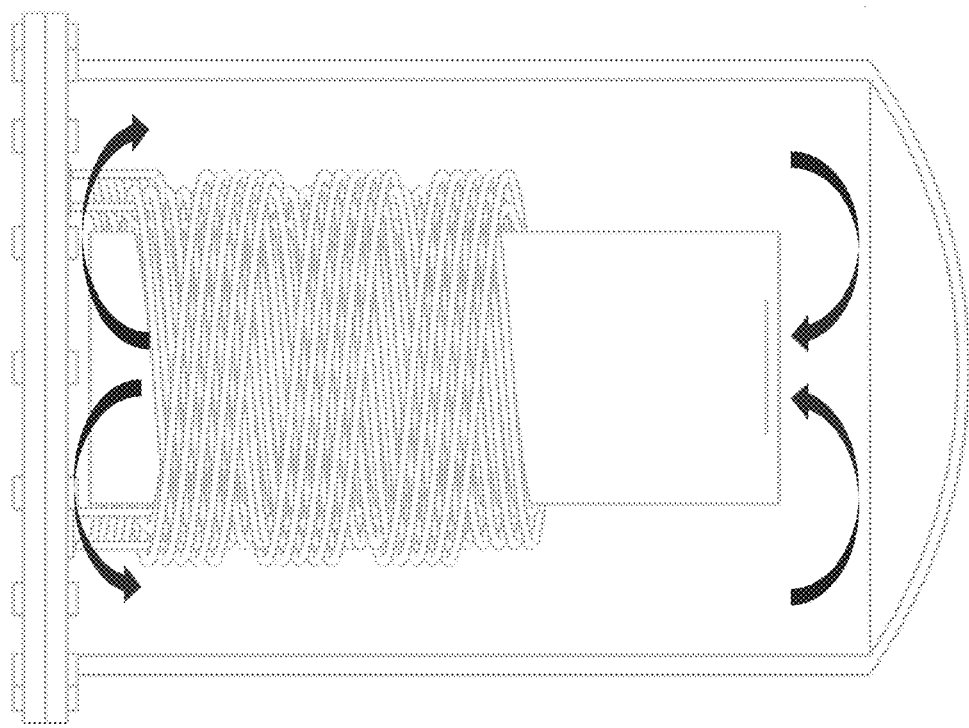
FIG. 3J2
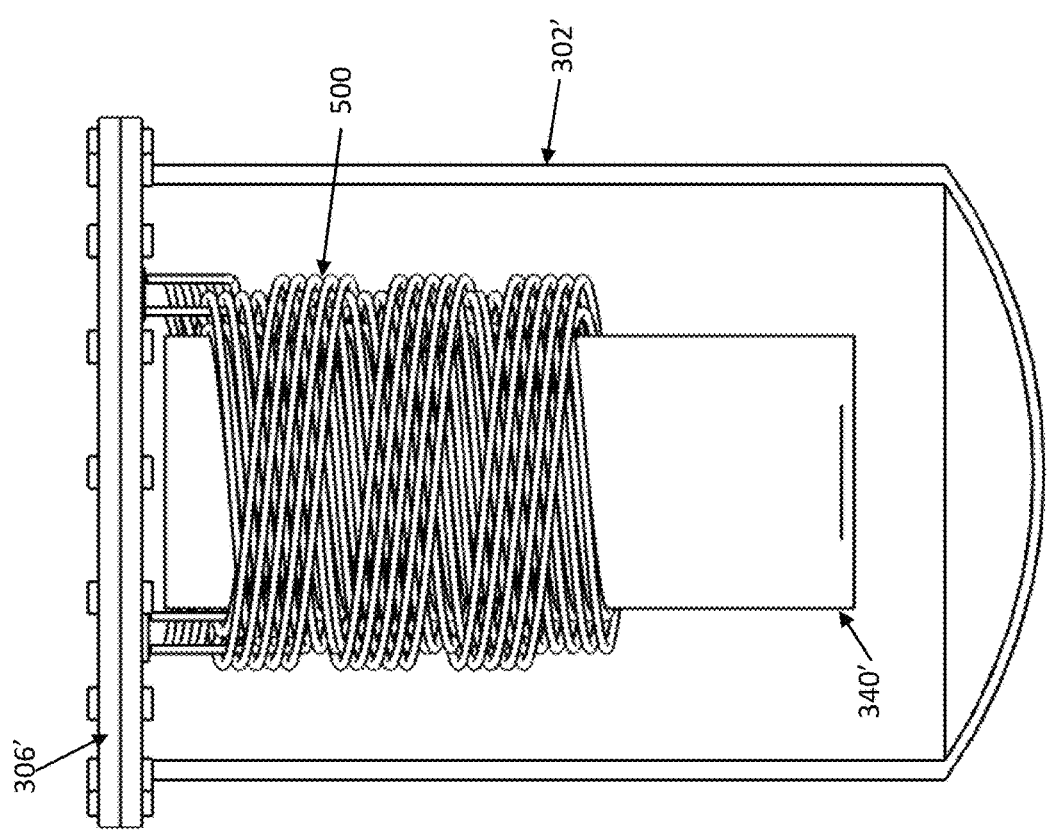
FIG. 3J1

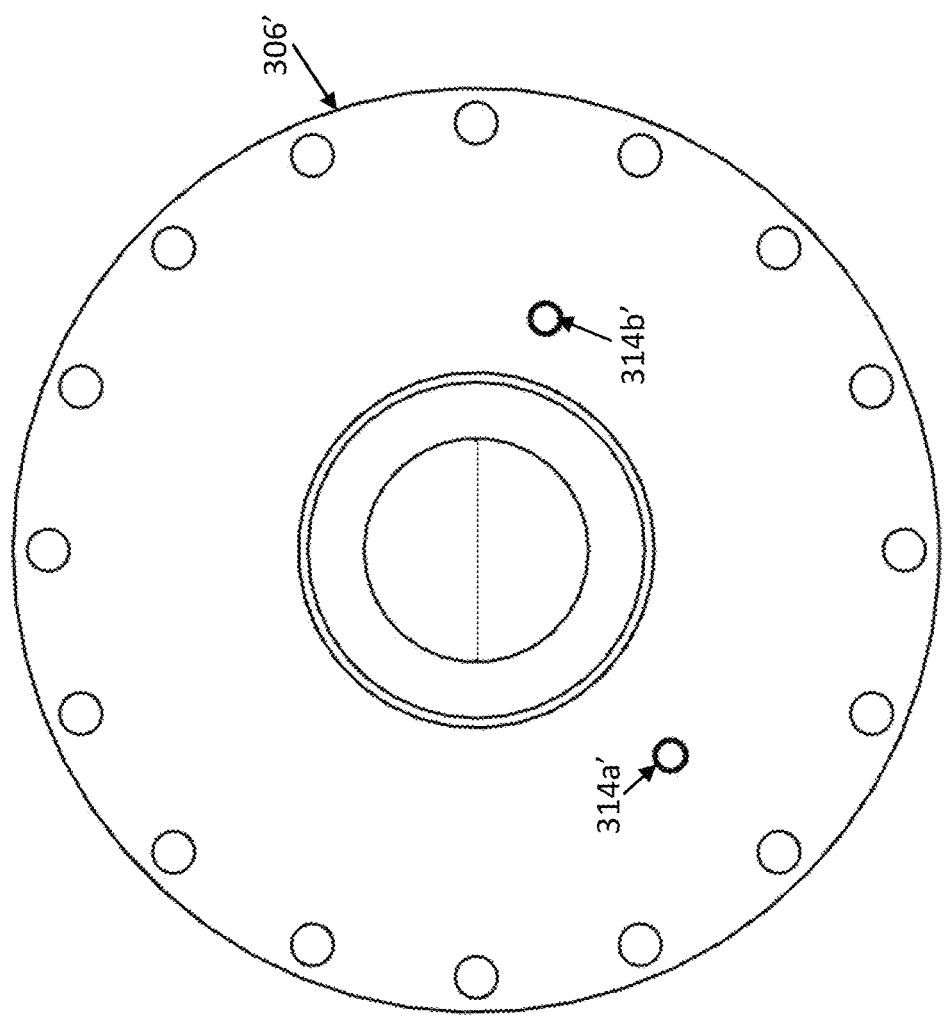
FIG. 3J3

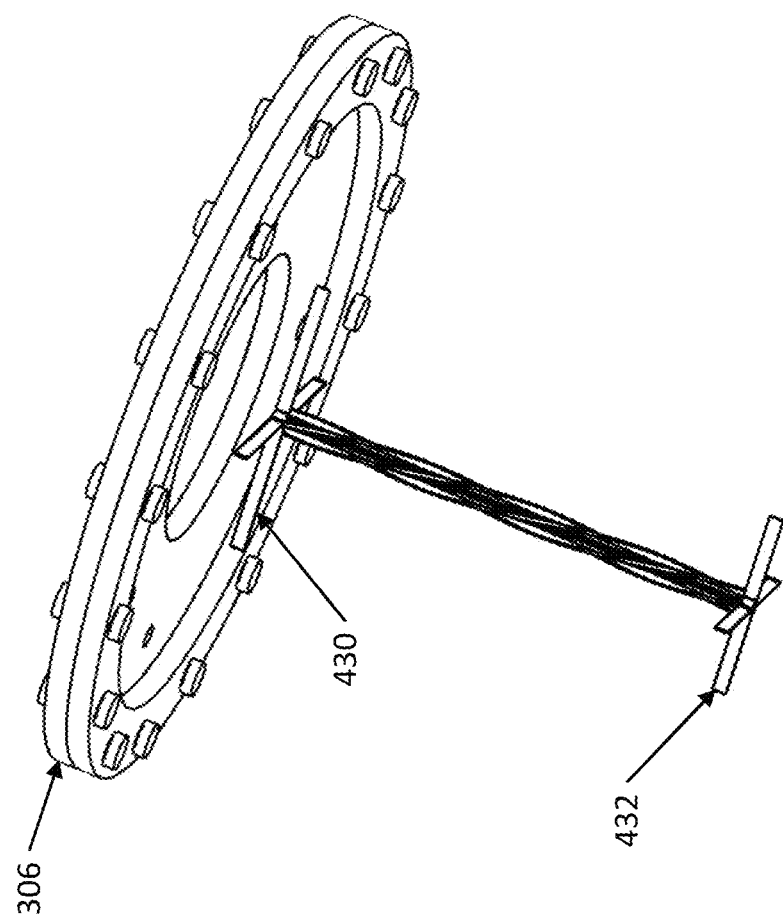
FIG. 4F2
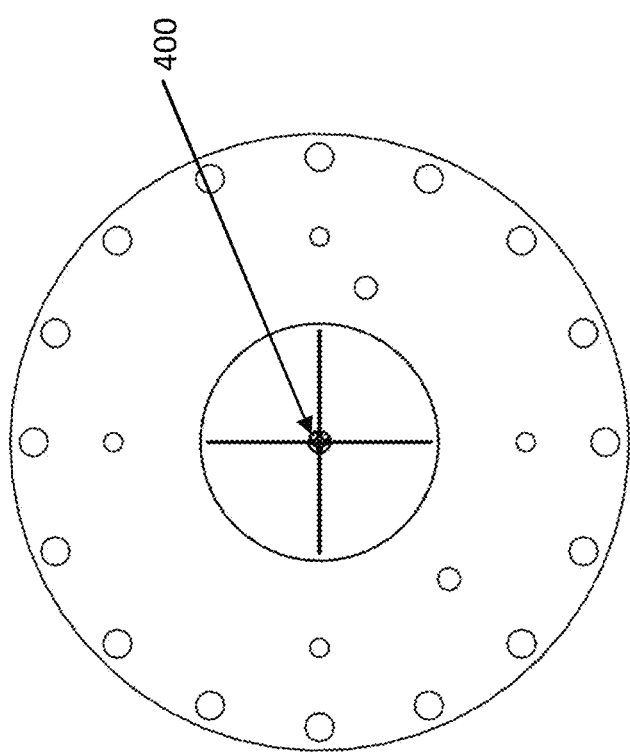
FIG. 4F1

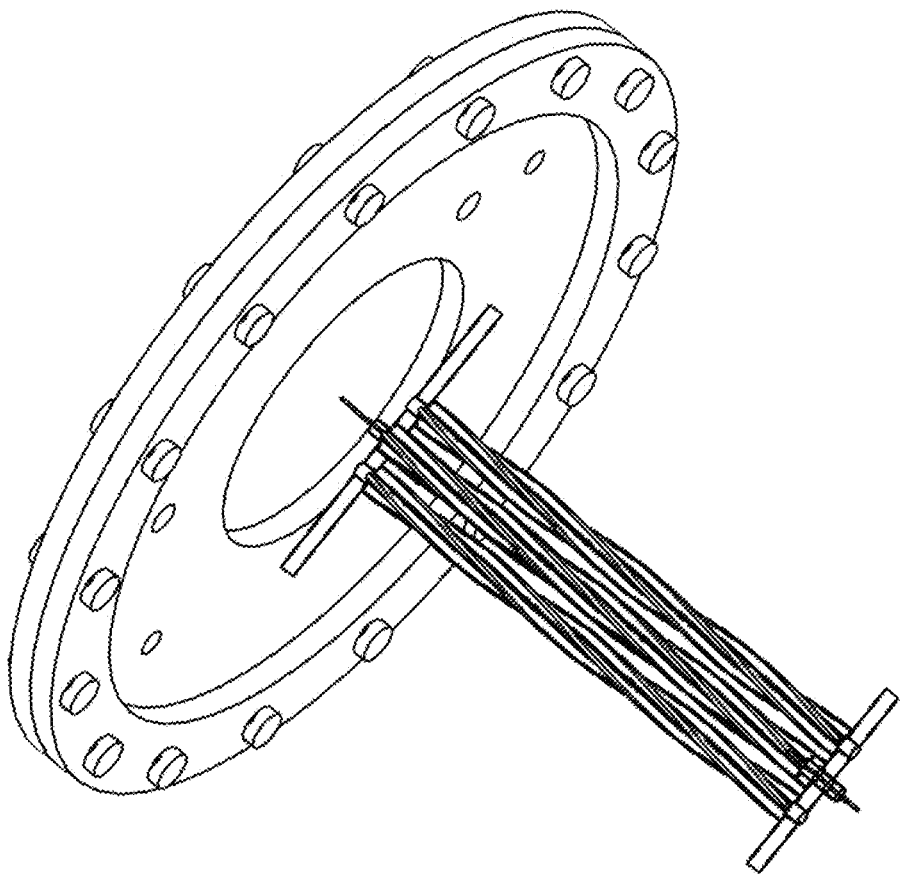
FIG. 4G2
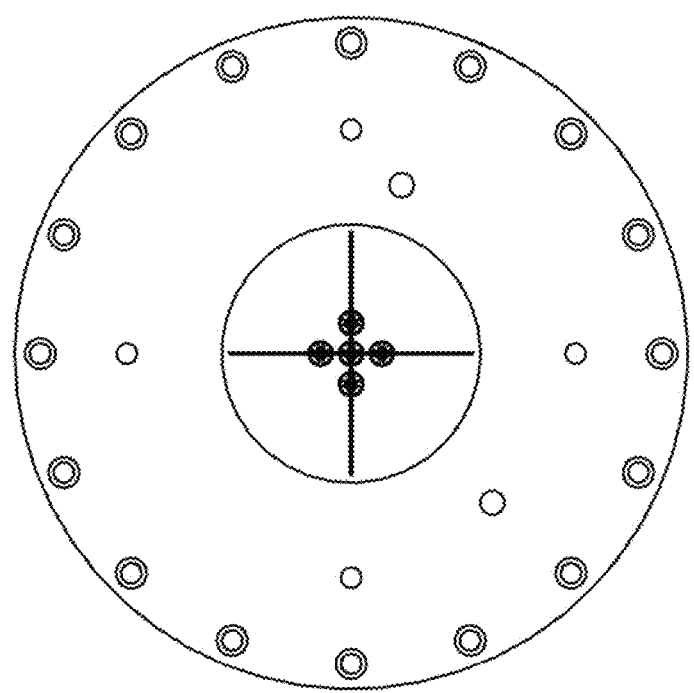
FIG. 4G1

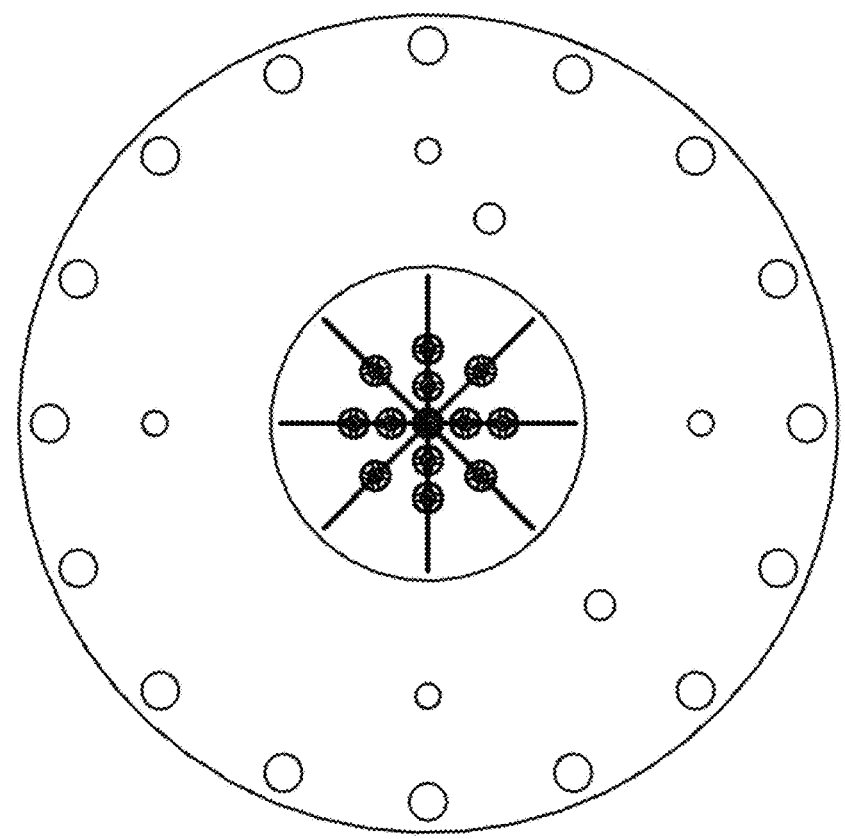
FIG. 4H2
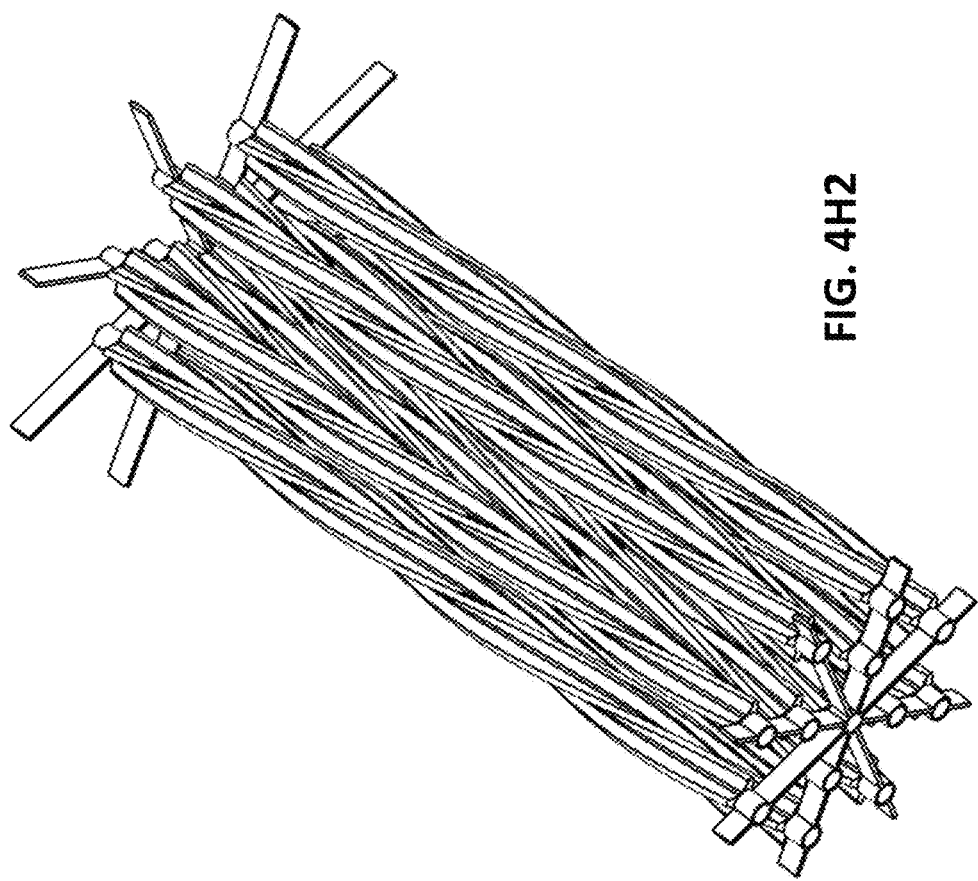
FIG. 4H1

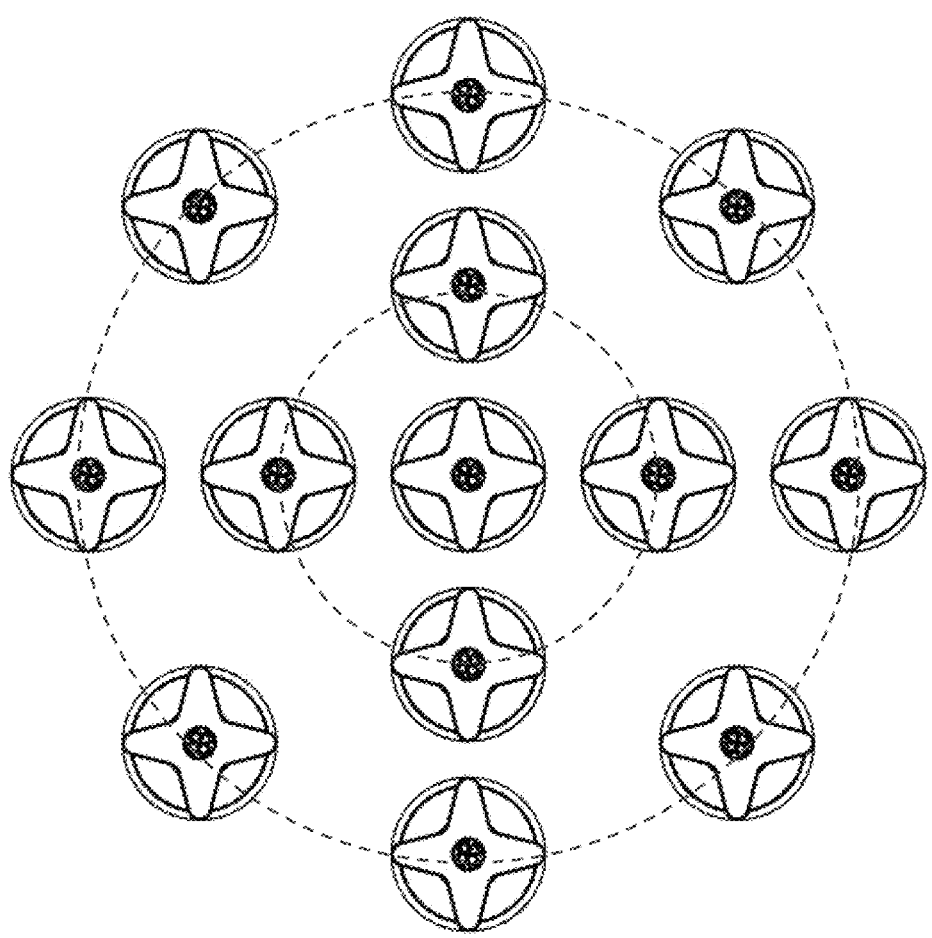
FIG. 4H3

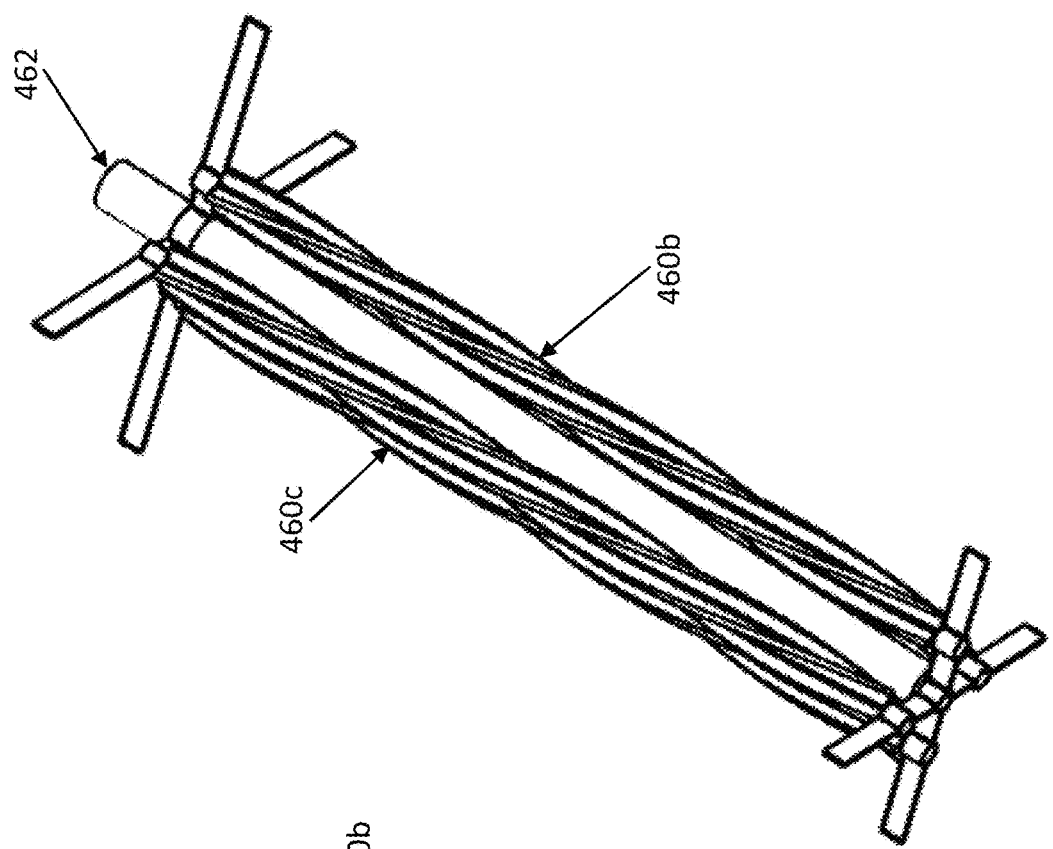
FIG. 4J2
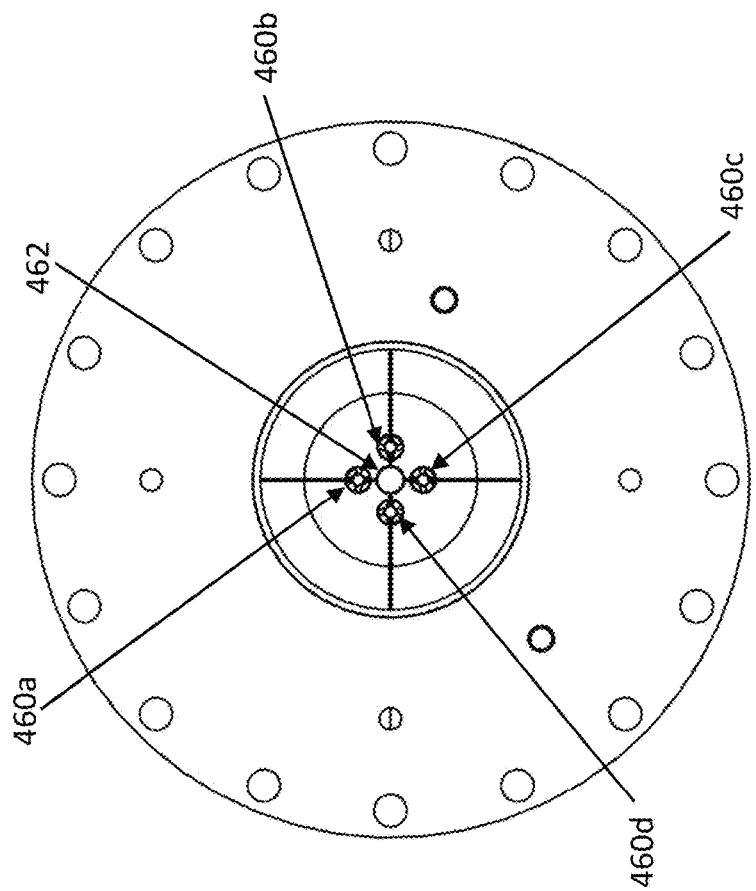
FIG. 4J1

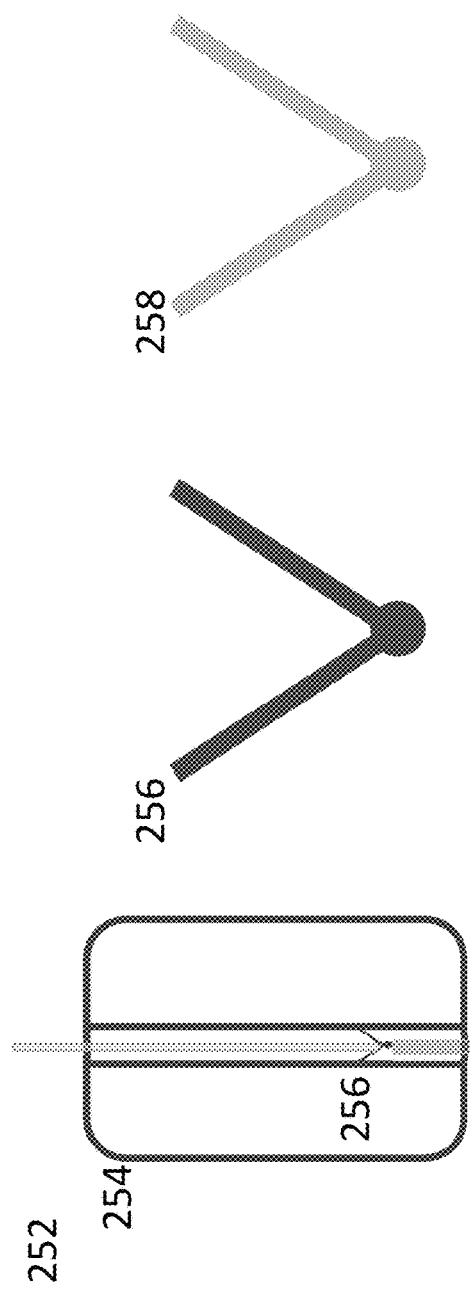
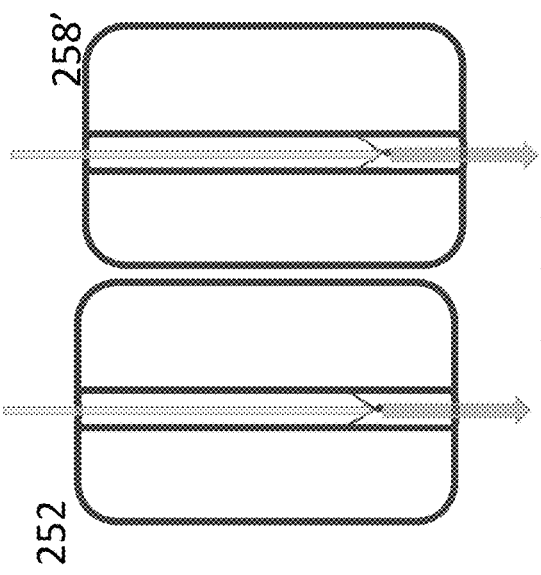
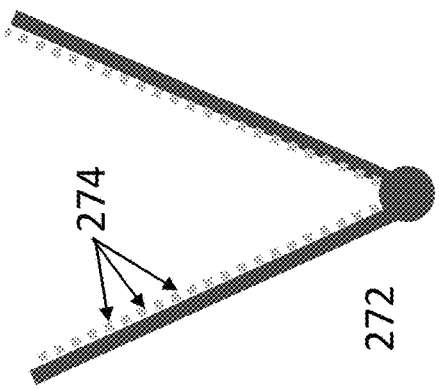
FIG. 11A
FIG. 11B
FIG. 11C
FIG. 11D
FIG. 11E
FIG. 11F

THORIUM FUEL ROD STRUCTURE AND ASSEMBLY

CROSS REFERENCE TO RELATED APPLICATIONS

This application is a Continuation of U.S. patent application Ser. No. 16/517,195, titled, "Thorium Molten Salt System for Energy Generation," filed on Jul. 19, 2019, which is a Continuation of U.S. patent application Ser. No. 16/517,096, titled, "Thorium Molten Salt Assembly for Energy Generation," also filed on Jul. 19, 2019.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to a system for generating power using a Thorium-containing liquid molten salt fuel and, more specifically, an accelerator-driven Thorium molten salt system for generating process heat and/or electricity resulting from nuclear fission reactions.

Description of the Related Art

Attempts have been made to provide an accelerator-driven system for the generation of energy using fuel material containing Thorium. To date, such systems have primarily been focused on the use of a solid or molten lead (or other heavy metal) spallation target to generate neutrons used to initiate or sustain nuclear fission reaction and fuel initially comprising of mixtures of Plutonium and Thorium. Examples of such systems are discussed below.

Ashley, Coats et. al, "The accelerator-driven Thorium reactor power station," Energy, Vol. 164, Issue EN3 at 127-135 (August 2011 Issue) discusses an accelerator-driven Thorium reactor in which a particle accelerator injects high-energy particles into a molten lead target to release neutrons via the spallation process. The article indicates that a fissile starter, such as Plutonium from spent fuel, is required, and that the core of the system includes a series of fuel pins, each containing mixed-oxide pellets comprised of Plutonium and Thorium. A similar system is disclosed in Ludewig and Aronson, "Study of Multi-Beam Accelerator Driven Thorium Reactor" (March 2011).

U.S. Patent Application Publication No. US2013/0051508, "Accelerator Driven Sub-Critical Core" purports to disclose "a fission power generator [that] includes a sub-critical core and a plurality of proton beam generators" where the generated proton beams "via spallation" generate neutrons for use in the system.

The use of heavy metal spallation targets poses several challenges as does the use of fuel initially containing Plutonium or Uranium.

The present inventions are directed to providing an enhanced system for energy generation providing benefits over, and overcoming shortcomings of, the systems and methods discussed in the materials referenced above, and other existing systems.

BRIEF SUMMARY OF THE INVENTION

A brief non-limiting summary of one of the many possible embodiments of the present invention is:

A Thorium fuel rod assembly including first and second support elements; and a plurality of Thorium fuel rods positioned between the first and second support elements, where each Thorium fuel rod includes both (a) an outer fuel element containing a solid Thorium containing material that: (i) is in the general form of a fuel element rod having a longitudinal length; (ii) defines an interior cavity extending along at least a majority of the longitudinal length of the fuel element rod; and (iii) defines a plurality of fins that project radially outwardly; and (b) an inner core element formed from a Beryllium-containing material positioned within the interior cavity defined by the outer fuel element that: (i) is generally tubular in form and has longitudinal length; (ii) has a longitudinal length greater than the longitudinal length of the outer fuel element such that at least a portion of the inner core element extends out of the top of the outer fuel element; and (iii) defines an inner cavity extending along at least a majority of the longitudinal length of the inner core element. In this example, the outer fuel element and the inner core element are formed such that beam of high energy particles may be directed into the inner cavity of the inner core element such that particles forming the impinge upon a Beryllium nucleus within the core to produce a (p, n) reaction resulting in the emission of a neutron and the emitted neutron may interact with a Thorium nucleus in the outer fuel element to cause the Thorium nucleus to fission.

Additionally, or alternatively, the present disclosure teaches a Thorium fuel rod that includes a fuel element containing solid Thorium, having a length and defining a central bore extending along at least a majority of the length; and an inner core element positioning within the central bore defined by the fuel element, the inner core having a length that extends along at least 75% of the length of the fuel element, the inner core defining an interior cavity, the interior cavity defining a void space, wherein the void space of the interior cavity is subject to a vacuum; and an end cap sealed to the inner core element in such a manner that the vacuum within the void space is maintained, the end cap being formed of a material capable of passing particles through the end cap such that the particles can impinge upon an nucleus forming the inner core, wherein the particles are of a sufficient level that impingement of a particle upon an nucleus forming the inner core can induce a (p, n) reaction resulting in the emission of a neutron having an energy level of 0.7 MeV or greater.

Additionally, or alternatively, the present disclosure also teaches a Thorium fuel rod comprising: a first rod-shaped element formed of a solid material containing Thorium, the rod defining a bore extending through at least the majority of its length, and wherein at least a majority of the length of the rod defining a plurality of radially extending fins; and a second rod-shaped element comprising Beryllium, the second rod-shaped element having a first section positioned within the bore defined by the first rod-shaped element and extending longitudinally along at least a majority of the length of the first rod-shaped element and a second section extending longitudinally outwardly from the bore.

Other potential aspects, variants and examples of the disclosed technology will be apparent from a review of the disclosure contained herein.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

DESCRIPTION OF THE VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

FIGS. 1A and 1B illustrates an embodiment of an exemplary accelerator-driven sub-critical Thorium molten salt system 1000 for generating useful energy (for example in the form of process heat and/or electricity) in accordance with certain teachings of this FIG. 2A provides details of the exemplary particle beam source 200 of FIG. 1. disclosure.

FIGS. 2E1, 2E2, 2E3 and 2E4 illustrate exemplary first, second, third and fourth beam shape and directional combinations that may be generated using the exemplary electromagnetic forming and steering assembly 208 of FIGS. 2A-2D.

FIGS. 3A-3H2 and 3J1-3J3 illustrate aspects of exemplary Thorium molten salt assemblies 300 that may be used in connection with the exemplary system 1000 of FIG. 1.

FIGS. 4A-4H3 and 4J1-4J2 illustrate examples of a novel Thorium fuel rod structure and fuel rod assembly utilizing such fuel rods constructed in accordance with certain teachings of this disclosure.

FIGS. 11A-11F illustrates exemplary neutron source targets 230 that may be used in connection with the embodiment of FIG. 10.

DETAILED DESCRIPTION

Figure 1B:
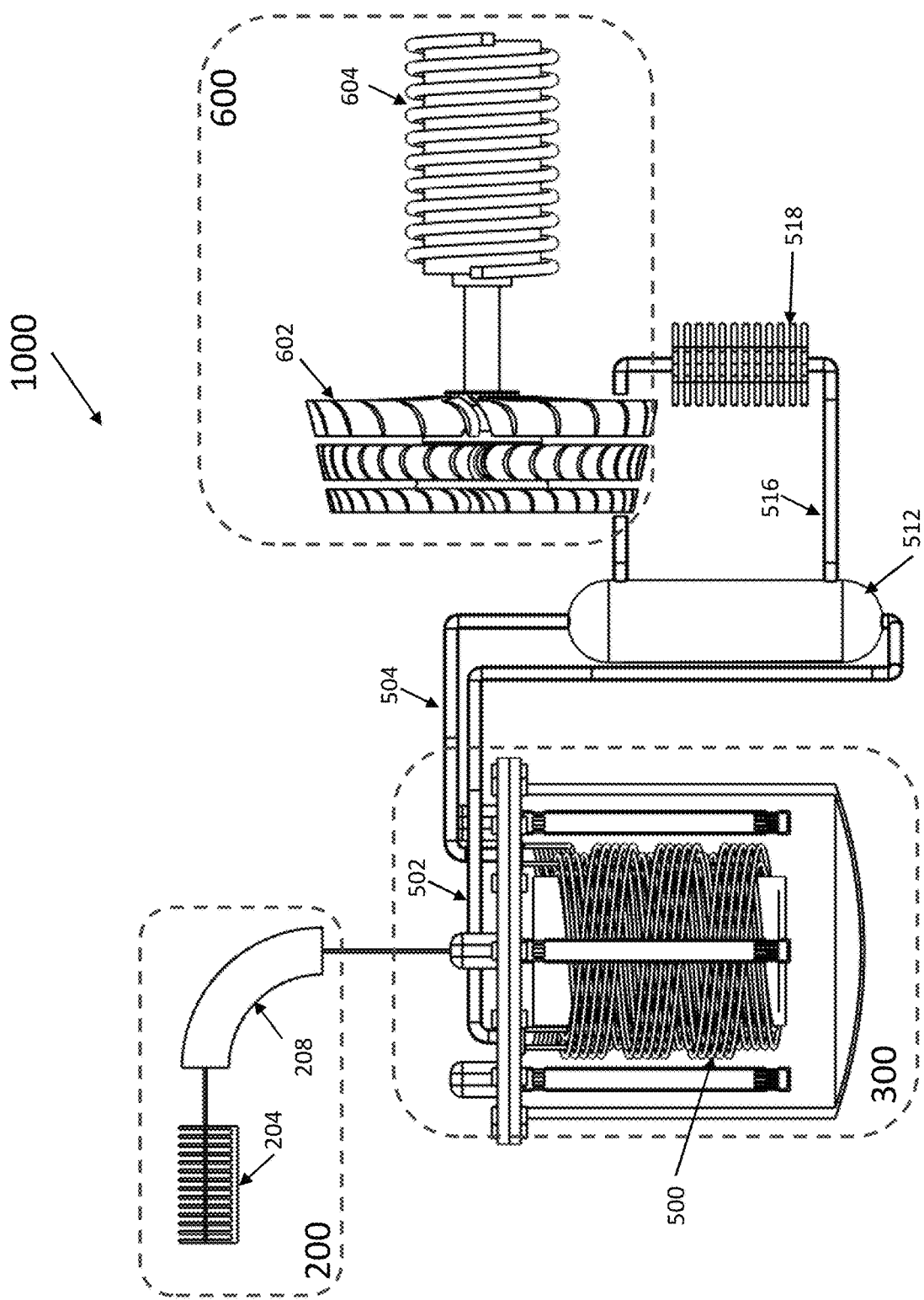

FIGS. 1A and 1B illustrate, in block and rough schematic form a first embodiment of an exemplary accelerator-driven sub-critical Thorium molten salt system 1000 for generating useful energy (for example in the form of process heat and/or electricity) in accordance with certain teachings of this disclosure.

As reflected in FIG. 1A-1B, the exemplary system 1000 includes a particle beam source 200 for producing a particle beam.

In the example of FIG. 1A-1B, the particle beam source 200 is adapted to vary the energy level of the produced particle beam such that the energy of the particles comprising the proton beam can vary between at least a first energy level and a second energy level, where the first energy level is at least approximately 4.5 MeV (and potentially up to or above 6 MeV) and the second energy level is at least 2.4 MeV.

As reflected in FIG. 1A the particle beam source 200 includes a power input 201 for receiving the power required to drive the particle source.

Figure 2A:
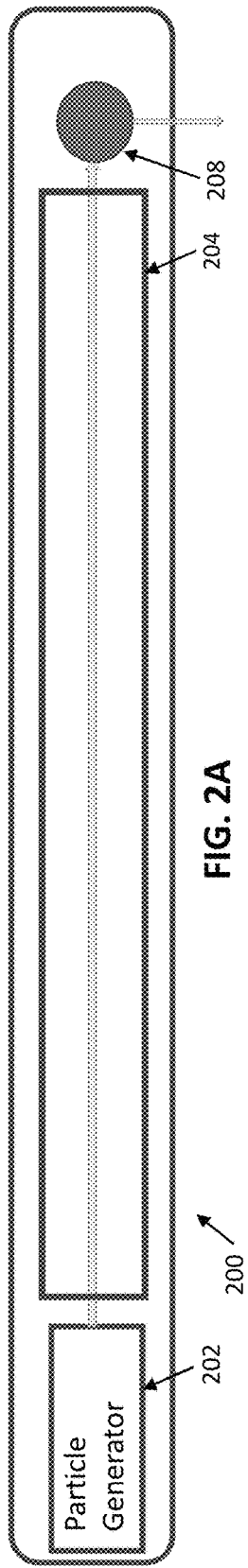

FIG. 2A provides details of the exemplary particle beam source 200 of FIG. 1. As reflected in FIG. 2, the exemplary particle beam source 200 includes a particle generator 202 for generating charged particles. In the example, of FIG. 2, the charged particles may take the form of a negatively charged hydrogen nucleus (for example, a neutral hydrogen atom with an added electron). The use of a neutral hydrogen atom with an added electron is exemplary for purposes of the present discussion and other charged particles may be used without departing from the teachings of the present disclosure. It should also be noted that the use of negatively charged particles is exemplary as well. One could implement the teachings of the present disclosure using positively-charged particles, although the references to positive and negative voltages in the discussion relating to how the particles are accelerated should be considered reversed when dealing with positively-charged particles (i.e., references to negative voltage should be replaced with positive voltage and vice versa).

In the example of FIG. 2A, the negatively charged generated particles from the particle generator 202 are applied to a vacuum accelerator assembly 204 that includes several individual vacuum voltage chambers. The vacuum accelerator assembly 204 receives the negatively charged particles from the particle generator 202 and accelerates the generated particles to provide a high energy particle beam at its output. The high energy output beam from the vacuum accelerator assembly 204 is provided to an electromagnetic forming and steering assembly 208 that converts the received particle beam into an output particle beam having desired shape and directional characteristics.

Figure 2B:
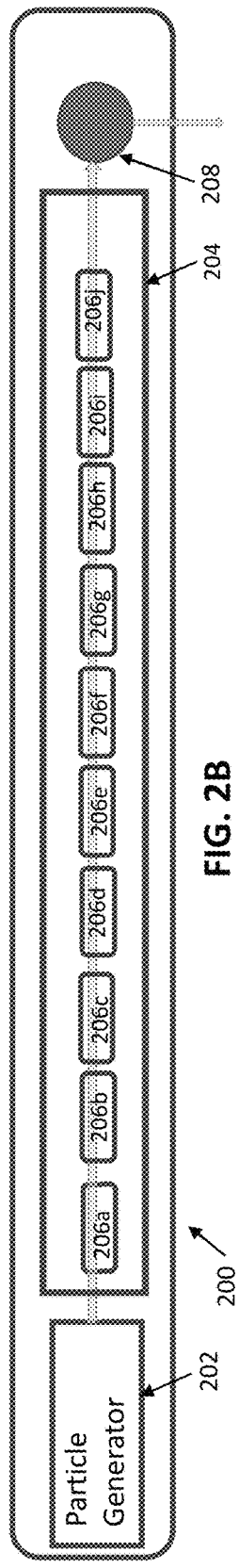
FIG. 2B illustrates an exemplary vacuum accelerator assembly 204 that may be used to form the particle beam source 200 of FIG. 2A.

FIG. 2B illustrates an exemplary vacuum accelerator assembly 204 that may be used to form the particle beam source 200 of FIG. 2A. In the example of FIG. 2B, the vacuum accelerator assembly 204 is formed from ten individual vacuum voltage chambers 206a-206j. Each of the vacuum voltage chambers is coupled to a vacuum source and to a source of electrical power such that the voltage chamber can be evacuated to provide a vacuum interior and such that a relatively uniform electrical potential (voltage) level within the chamber can be established. The vacuum voltage chambers may be arranged in four groups, a first group comprising chambers 206a-206b, a second group comprising chambers 206c-206d a third group comprising chambers 206g-206h and a fourth group comprising chambers 206i and 206j. Chambers 206e-206f may collectively be used to form a nitrogen stripping chamber as discussed in more detail below.

Figure 2C:
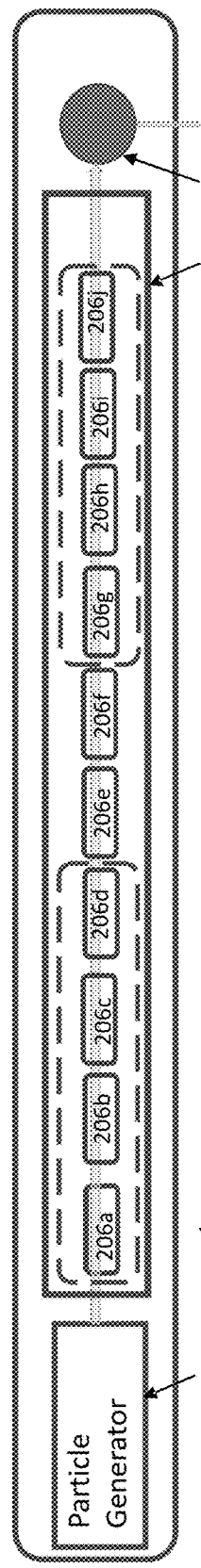
FIG. 2C generally illustrates the way the exemplary particle beam source 200 may be operated to generate protons of a first energy level.

FIG. 2C generally illustrates the way the exemplary particle beam source 200 may be operated to generate particles having a first energy level. Referring to the figure, in this mode, during operation of the assembly 204, the first and second groups of vacuum voltage chambers (i.e., each of the voltage chambers 206a-206d) is energized such that the voltage potential in these chambers is positive, with the magnitude of the electrical potential increasing from chamber 206a to 206d. Because the particles generated by the particle generator 202 will have a negative charge, the positive voltage potential within chambers 206a-206d, and the differential in the magnitude of the positive voltage between chambers 206a-206d will cause the generate particles to move into and accelerate through chamber 206a towards chamber 206b, with the particles accelerating as they move through the identified chambers as the result of the increasing voltage potential from chamber 206a to 206b. The particles will move into chamber 206b and be accelerated, in the same manner, towards and into chamber 206c. The process will be repeated with the particles continuing to accelerate, and gain energy, as they pass into and through chamber 206d.

In the illustrated example of FIG. 2C, during this first mode of operation, vacuum voltage chambers 206e and 206f are configured such that they have no net voltage potential. As a result, the particle moving through these chambers will not be accelerated but will—in essence—"coast" through the chambers 206e and 206f as a result of the momentum created by the movement and acceleration provided by chambers 206a-206d. In the illustrated example, chambers 206e and 206f, while not maintained at a specific voltage level, are filled with charged nitrogen gas to form a nitrogen stripping chamber. This gas will tend to strip off electrons from the particles traveling through chambers 206e and 206f, thus causing the moving particles to transition from negatively charged particles to particles having a positive charge. In the specific example under discussion, the stripping chamber will strip off the two electrons associated with the negatively charged hydrogen generated by particle accelerator to provide a positively charged particle consisting of a single proton.

In the illustrated example of FIG. 2C, in the operating mode, the vacuum voltage chambers in the third and fourth groups (i.e., chambers 206g-206j) are activated such that the voltage levels within the chambers are negative, with the magnitude of the voltage levels within the chambers increasing from chamber 206g-206j. As a result of these established voltage levels, the positively charged particles traveling through chamber 206f will be attracted into chamber 206g and accelerated through chamber 206g to chamber 206h where they will be further attracted toward, and accelerated through, chambers 206i and 206j. Because of the increasingly negative voltages created within chambers 206g-206j, the particles passing through the chamber will continue to accelerate as they pass through the identified chambers to and from a high energy particle beam at the exit of vacuum accelerator assembly 204.

In the example of FIG. 2B, the voltage levels of the chambers 206a-206j are established such that the energy level of the particles exiting the particle beam source 200 are at least on the order of approximately 4.5 MeV.

Figure 2D:
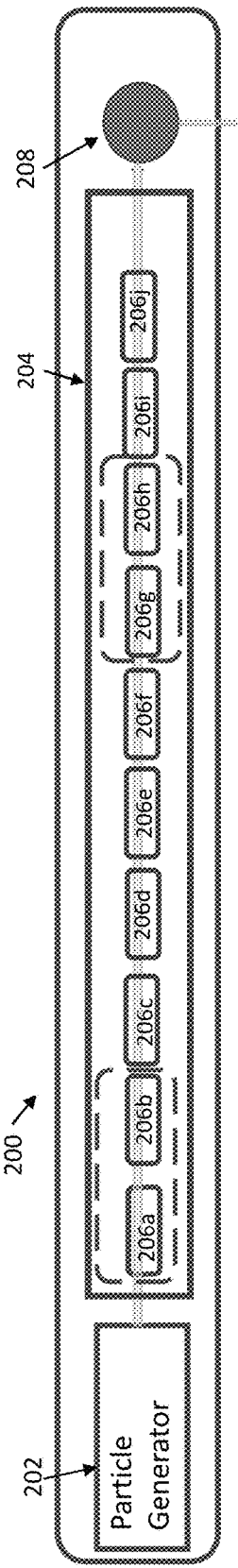
FIG. 2D illustrates the way the particle beam source 200 of FIG. 2A may be operated to produce a proton beam of a second energy level, where the second energy level is less than the first energy level discussed above.

FIG. 2D illustrates a second mode of operating the particle beam source 200 of FIG. 2A may be operated to produce a proton beam of a second energy level, where the second energy level is less than the first energy level discussed above.

The operation reflected by FIG. 2C is like that discussed above with respect to FIG. 2B except that, in the example of FIG. 2C, only the vacuum voltage chambers in the first and third groups are activated such that no voltage potential is established within chambers 206b, 206d, 206h or 206j. As such, the protons traveling through the illustrated assembly will not be accelerated through those chambers and the energy level of the traveling protons will not increase as they pass through the chamber. As a result, the energy level of the protons emitted by the particle beam source 200 will be at a reduced energy level which, in the example of FIG. 2C is an energy level of at least about approximately 2.5 MeV and below the first energy level.

While a specific exemplary proton generator was described with respect to FIGS. 2A-2D, it should be accepted that other particle beam sources may be used in the exemplary system 1000 of FIG. 1 without departing from the teachings of this disclosure. Additionally, while the exemplary particle beam source of FIG. 2A was illustrated and described as using a vacuum accelerator assembly having only ten voltage chambers, it should be understood that particle beam sources having fewer or more chambers may be used to carry out the teachings of this disclosure. Still further, while the above example describes operation of a particle beam generator to generate beams comprising particles having either a first or a second energy level it will be appreciated that the teachings of this disclosure can be used to provide a particle beam source where the particles comprising the provided beam can have multiple energy levels in excess of the two discussed herein and/or where the energy levels of the particles comprising the provided beam are well above the first energy level discussed herein, and/or below the second discussed energy level. For example, embodiments are envisioned wherein the first energy level exceeds about 10 MeV.

Referring to FIG. 2A, the particle beam generated by the vacuum accelerator assembly 204 is provided to an electromagnetic forming and steering assembly 208 that transforms the received particle beam into an output beam having desired projection pattern (i.e., a desired shape) and directional characteristics. In the example of FIG. 2A, the electromagnetic forming and steering assembly 208 may take the form of a beam focusing/defocusing instrument. Such an instrument may, in some embodiments, take the form of a quadrupole magnetic assembly that may be energized to provide output beams having at least first and second shaped characteristics and multiple directional characteristics.

FIGS. 2E1, 2E2, 2E3 and 2E4 illustrate exemplary first, second, third, and fourth beam shapes that may be generated using the exemplary electromagnetic forming and steering assembly 208 of FIGS. 2A-2D As reflected in FIG. 2E1, the beam provided as an output of the forming and steering assembly 208 may take the form of a focused "spot" beam or a beam having a relatively small primary point of focus. Through proper energization of the beam forming and steering assembly 208, the spot beam may be directed to a single point, to various points at different times or, in some embodiments, to scan across a general area.

As reflected in FIG. 2E2, the forming and steering assembly 208 can adjust the overall size of the spot beam such that the general diameter of the beam can be greater than the diameter of the narrower spot beam reflected in FIG. 2E1. In addition to providing spot beams of first and second diameters, as reflected in FIG. 2E2, the forming and steering assembly 208 can also be used to provide a spot beam that varies, smoothly or in steps, from a first, relatively narrow spot, to a second, larger-diameter spot.

FIGS. 2E3 and 2E4 reflect operation of the forming and steering assembly 208 in an alternate matter to generate a beam that takes the general form of a ring, with FIG. 2E3 illustrating a ring having a first inner and first outer diameter, and FIG. 2E4 illustrating a ring having a second inner and second outer diameter, where the second inner diameter is greater than the first inner diameter and where the second outer diameter is greater than the first.

Although not illustrated in FIGS. 2E1-2E4, embodiments are envisioned where rings of various inner and outer diameters can be produced by assembly 208 and/or where rings of variable sizes may be generated such that the beam can be varied from a spot to rings of increasing inner and outer diameters until a maximum outer diameter is reached, down again to a spot through rings of progressively decreasing inner/outer diameters, and then have the process repeated again in a cyclic fashion. This variation can be accomplished by smoothly changing beam shapes or through steps. During such cyclic operation, the amount of time the system is maintained at the various shape and directional points can be varied such that the system, for example, dwells at a spot point for a first period of time, and then cycles through rings of various sizes for a second period of time, where the first period of time is longer than—and potentially multiples of—the second period of time.

In addition to providing particle beams of varying shapes and varying general energy levels, the particle beam source 200 of the present example can be controlled to provide particle beams of varying intensity (or current). This can be accomplished by controlling the operation of the particle generator 202 to generate fewer or more particles at any given time.

Referring to FIGS. 1A and 1B, in the exemplary system, the particle beam generated by the particle beam source 200 is provided to a Thorium molten salt assembly 300.

FIGS. 3A-3H2 and 3J1-3J3 illustrate aspects of exemplary Thorium molten salt assemblies 300 that may be used in connection with the exemplary system 1000 of FIG. 1.

Turning first to FIGS. 3A-3D, a first exemplary Thorium molten salt assembly 300 is illustrated. As reflected in the figure, the illustrated Thorium molten salt assembly 300 includes a main body 302 in the form of a large, tub-like structure. The main body 302 forms a vessel which may contain molten salt including Thorium. In general, the main body 302 should be formed from a substance that can withstand the environment that will exist within and outside of the assembly 300. In particular, the main body 302 should be formed from a material that is generally resistant to the chemical characteristics of the molten salt fluid that will be contained within the assembly 300. While a variety of different materials may be suitably utilized, nickel-based steel alloys, such as Hastelloy-N, may be used to form the main body 302 and, indeed, all components in contact with molten salts comprising the various exemplary molten salt assemblies discussed herein. Other potentially suitable materials include stainless steels or Incolloy. Additionally, coatings can optionally be applied to the identified (and other) materials to enhance their resistance to corrosion.

As reflected in FIGS. 3A-3D the bottom of the main body 302 is generally rounded. This rounded bottom shape is believed to be beneficial in promoting optional fluid circulation within the assembly 300. The round bottom can also be of benefit in properly locating the assembly 300 within a shielding structure, as discussed in more detail below.

In the example of FIGS. 3A-3D the main body 302 is coupled by, for example welding to a lower flange element 304. The lower flange element 304 defines a lower flange surface that, in turn, defines a plurality of bolt openings (unlabeled in FIGS. 3A-3B).

An upper lid assembly 306 is coupled to the lower flange element 304. The outer portions of the upper lid assembly 306 define an upper flange section (not separately labeled) that is arranged in general alignment with the lower flange element 304. The upper flange section of the lid assembly 306 defines a plurality of bolt holes where the bolt holes are preferably of the same number and sized to align with the bolt openings of the lower flange element 304.

Figure 3D:
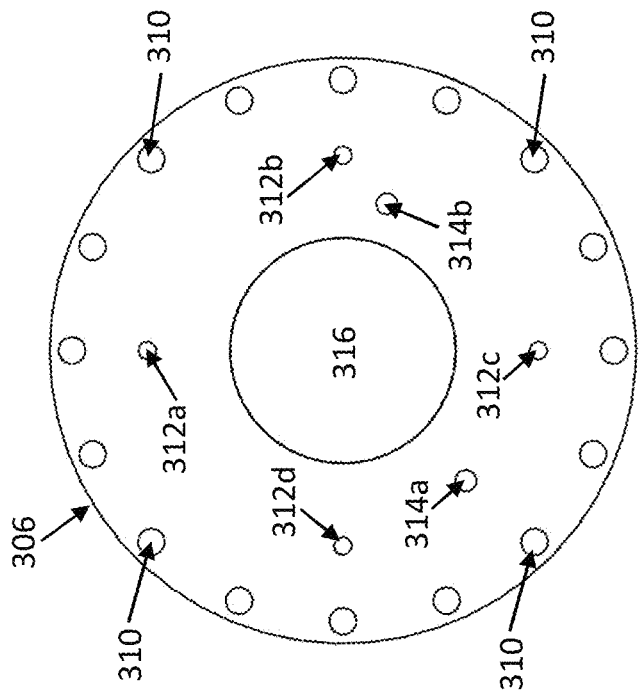

While the number of bolt openings can vary, in preferred embodiments at least eight bolt openings are provided. In the example of FIGS. 3A-3B both the lower flange element 304 and the upper flange section of lid 306 defines sixteen bolt openings. Bolts 308 (only one of which is labeled in FIGS. 3A-3D are used to couple the lid 306 to the lower flange element 304. The use of bolts to couple the lid 306 to the lower flange element 304 is exemplary and other forms of coupling may be used. For example, screws, clamps and other mechanical assemblies may be use. In embodiments where ready separation of the lid assembly from the lower flange element 304 is undesirable, welding may be used. The use of bolts in FIGS. 3A-3D permits ready attachment and separation of the lower flange element 304 and the upper flange section of lid 306, simplifying the assembly and disassembly of the exemplary molten salt assembly 300.

As illustrated in FIGS. 3A-3D, the bolt openings in the lid assembly 306 and the lower flange element 304 are such that they open outside the interior of the main body 302 in which the molten salt will be located. As such, the bolt openings do not give rise to any penetrations into the interior of the main body 302.

Referring to FIG. 3D, which shows a top-view of the lid assembly 306, it may be seen that in the illustrated exemplary embodiment (in addition to defining bolt openings 310, only four of which are labeled in FIG. 3D) the lid assembly defines four impeller openings 312a-312d that pass from the outside of the lid assembly 306 into the interior of the main body. The lid 306 further defines two heat exchanger openings 314a and 314b that provide openings that extend from the exterior of the main body 302 into the interior of the main body 302.

As best reflected in FIG. 3D, the lid 306 is a two-piece assembly that includes a generally ring-shaped main section of a first thickness and an inner disc-element 316 of a second thickness, where the second thickness is less than the first thickness. The window element 316 is intended to provide a "window" into the interior of the main body 302 through which certain types of particles, specifically at least the particles provided by the particle beam source 200 (and, potentially, neutrons) can pass. In the example of FIGS. 3A-3D, the window 316 is formed from a disk of any suitable material and may take the form of titanium, or aluminum titanium, or any other suitable material that will pass the particles provided by the particle beam source 200. The window element 316 should have a thickness sufficient to pass particle beams of the type necessary for operation of the systems described in this disclosure.

The window element 316 maybe coupled to the ring-shaped section of lid 306 in any suitable manner. In some embodiments, the window element may be bolted onto, screwed onto, screwed into or otherwise mechanically coupled to the ring-shaped section of lid 306. In other embodiments, the window element 316 may be welded to, brazed to, integrally formed within or otherwise attached to the ring-shaped section.

While the window element 316 is illustrated as being circular in shape in FIG. 3D, it should be understood that the window element 316 may take the form of other shapes such as, for example, a square, oval, or pentagon. In still other alternative embodiments, instead of a single large window element 316, multiple window elements are provided where the collection of window elements collectively define multiple passages through which high energy protons can enter the main body 302.

Figure 3C:
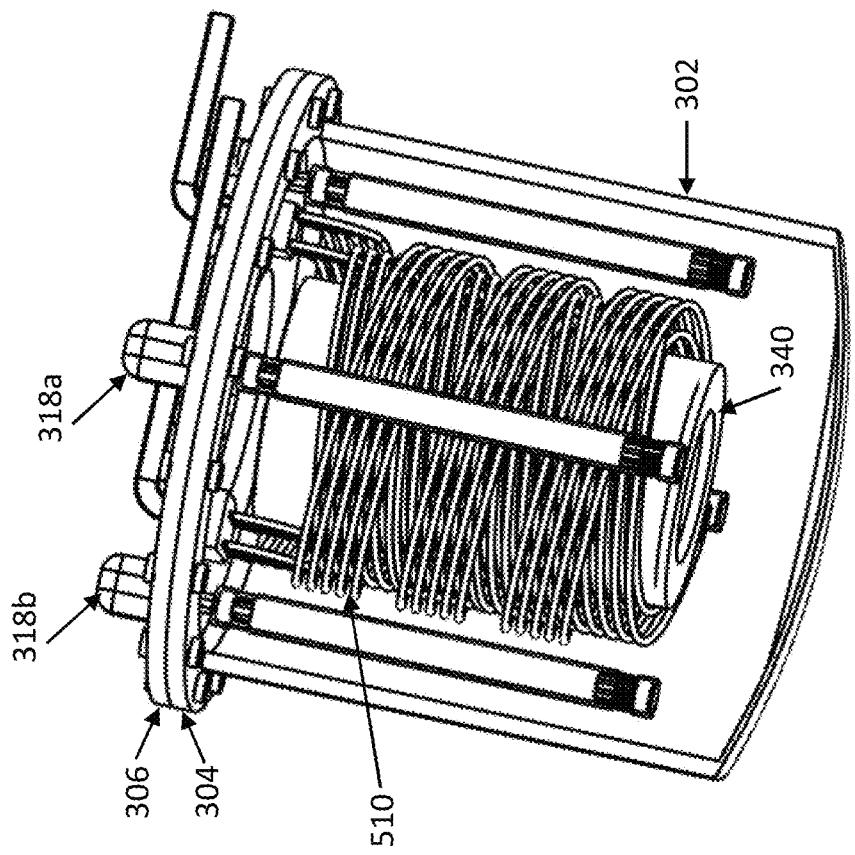

As best shown in FIGS. 3A-3C, in the example under discussion, a plurality of motor-driven impeller pumps 318a-318d are provided. The general construction of each of the impeller pumps is shown in FIGS. 3E1-3E2.

As reflected in FIGS. 3E1-3E2, in the exemplary embodiment under discussion, each of the impeller pumps 318 includes a variable speed motor 320 that is coupled to a shaft 330. The variable speed motor may take the form of any suitable variable speed motor such as a variable frequency induction motor, a brushless permanent magnetic motor or a switched reluctance motor. In the example of FIGS. 3E1-3E3, the variable speed motor 320 takes the form of a variable frequency driven induction motor. Although not illustrated, it will be understood that such a motor will include a rotor and a stator with windings and the windings will be coupled to a variable frequency drive that can provide power to the motor 320 in such a manner that the rotational speed of the motor can be controlled.

As shown in FIG. 3E3, the motor shaft 330 extends downward from the motor and is coupled to an impeller element 332.

In the example under discussion, the pump further includes a bearing assembly 322 through which the shaft 330 passes. As described in more detail below, the bearing assembly 322 of each impeller pump 318 in the example under discussion is positioned within one of the impeller openings of the lid 306. Because the impeller shaft has to pass through the top lid, the penetration should include high temperature seals to prevent the leakage of materials and gases from the interior of the main body 302 to the exterior of the body.

The illustrated impeller pump 318 also include a pump body 324 that defines an upper fluid opening 326 and a lower fluid opening 328.

The impeller pump 318 is designed such that, during operation, activation of the motor 320 will result in rotation of the shaft 330 and, therefore, rotation of the impeller element 332. The rotation of impeller element 330 will create a pressure differential across the inner chamber defined by the pump body 324 such that fluid will tend to be drawn into the upper fluid opening 326, flow through the chamber defined by pump body 324, and out the lower fluid opening 328. The rotational speed of the motor can be controlled to vary the pressure drop through the pump body 324 and, thus, the extent of the fluid flow through the pump.

Referring to FIG. 3C it may be seen that the molten salt assembly 300 also includes a tubular member 340 positioned within the main body 302. The tubular member 340 includes openings at both its top and bottom ends such that liquid, such as a Thorium-containing molten salt, can flow into the bottom of the tubular member 340, up through the tubular member, and out, over the top of the tubular member 340. As best reflected in FIG. 3C, the bottom of the tubular member 340 can define a lower ledge structure.

In general, the tubular member 340 defines an interior space within the main body 302 within which, and among, various structures can be positioned and through which liquid can flow.

Figure 3F:
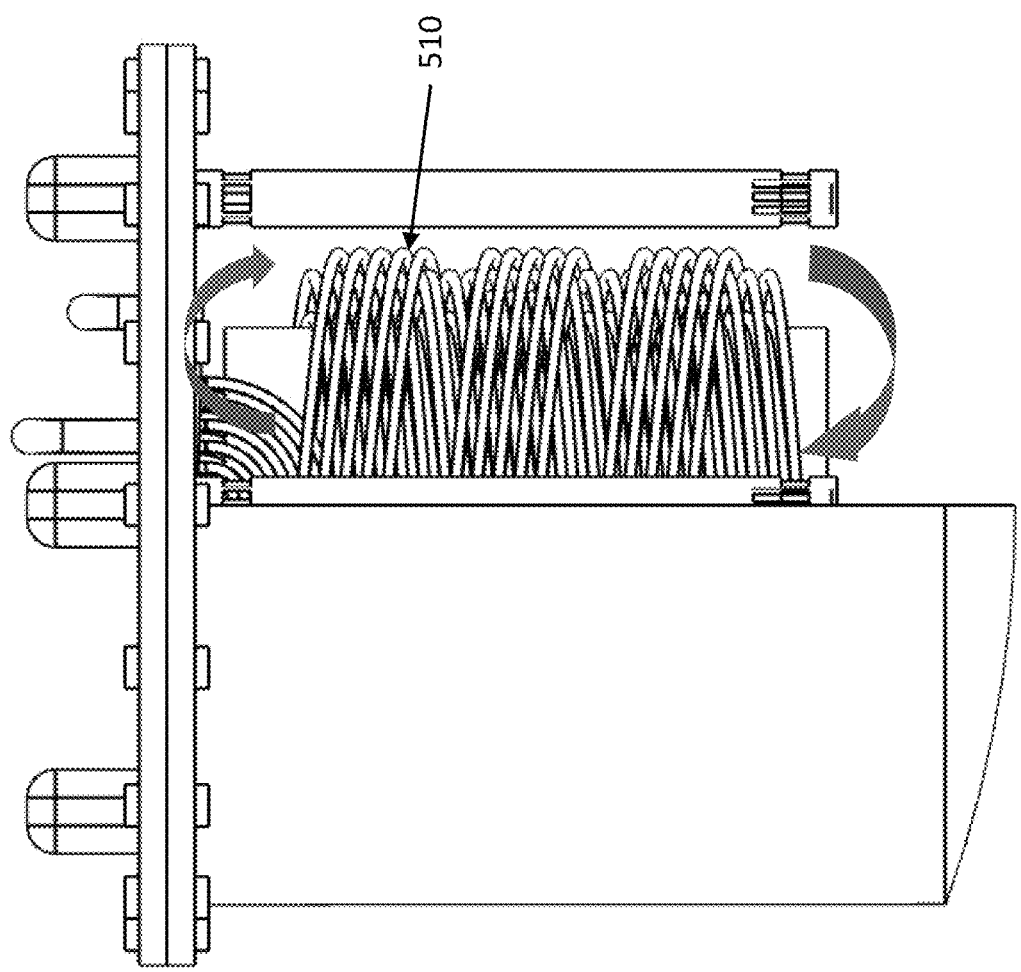

Referring to FIGS. 3B, 3C and 3F, it may be seen that the tubular member 340 and the impeller pumps 318 are dimensioned such that the upper fluid opening 326 opening of the pump body 324 includes a portion that extends below the top of the tubular member 340 and the lower fluid opening 328 of the tubular member 340 is positioned above the bottom of the tubular member 340. As reflected in the figures, the length of the tubular member 340 and the impeller pump 318 are such that the bottom end of the tubular member and the lower fluid opening 328 of the impeller pumps 318 are within the lower portion of the main body 302 such that an adequate flow path (to the left in the figure) is provided. In the specific example in the referenced figures, the lower fluid openings of the impeller pumps are within the lower one-third of the main body 302. The result of such positioning is that operation of the impeller pumps 318 will tend to cause fluid to flow up and out of the tubular member 340, over the top of the tubular member 340 and down through the main body 302 (and partially through the pump body 324). Thus, operation of the impeller pumps 318a-318d will tend to cause fluid flow within the main body 302 along the path generally reflected by the arrows in FIG. 3F.

As will be appreciated, the fluid flow path depicted in FIG. 3F will exist for each of the four impeller pumps 318a-318d illustrated in FIGS. 3A-3F. As such, operation of the impeller pumps will tend to result in a circulating flow of fluid where fluid flows through a circulation path whereby it initially circulates into the bottom of the tubular member 340, flows up through the tubular member 340, then out and over the top of the tubular member 340, and down the outside of the tubular member 340, where it circulates back up and into the bottom of the tubular member and the cycle is repeated.

In the embodiment of the molten salt assembly 300 previously described, and in all embodiments of the assembly 300 discussed herein a Thorium containing molten salt will be held in the main body 302. While the exact composition of the molten salt within the main body 302 will vary, embodiments are envisioned where the molten salt will contain at least a Lithium salt, a Beryllium salt and a Thorium salt, such that Lithium, Beryllium and Thorium exist within the molten salt. One suitable salt is a FLiBe salt containing dissolved Thorium. Other embodiments are envisioned wherein the molten salt does not include Beryllium but does include Lithium. One such salt is FLiNaK. In general, the quantity of molten salt within the main body 302 should be such that the upper level of the molten salt is over the top of the tubular member 340. Still further embodiments are possible where the molten salt is a chloride salt that contains chlorine, as opposed to fluorine.

FIG. 3G1 illustrates a cross-section of the main body 302 and includes a dashed line 342 reflecting the general level of molten salt in the exemplary assembly 300. As reflected in FIG. 3G1, the upper level of the molten salt is both above the upper surface of the tubular member 340 and below the lower surface of the lid assembly 306. As such, an open region 346, not including any molten salt, but capable of containing gases, exists between the level of the molten salt and the lower surface of the lid 306 (and the lower surface of window element 317 for the interior region of the illustrated assembly). This open region 346 is further illustrated by the dark gray areas of FIG. 3G2. This open region 346 may be used to store gases generated as a result of fission processes that can occur within the main body 302. In certain embodiments, the open region 346 can initially be filled with an inert gas, such as argon, prior to the operation of the system.

In the embodiment of FIGS. 3A-3F, impeller pumps 318a-318d are used to circulate the fluid in the main body 302. Alternate embodiments are envisioned wherein natural circulation is used to provide a fluid flow, generally along the path described above with respect to FIG. 3F. Such an alternate embodiment is depicted in FIGS. 3J1, 3J2 and 3J3.

Referring to FIGS. 3J1 and 3J2, it may be noted that the overall structure of the illustrated exemplary molten salt assembly 300' is like that described above in connection with FIGS. 3A-3F, with the primary differences being that the main body 302' of the embodiment of FIGS. 3J1 and 3J2 is taller and narrower than the main body 302 of the first-described embodiment, the tubular member 340' is longer and narrower than the tubular member 340 in the first-described embodiment and the helical heat exchanger assembly 500 (discussed in more detail) below is positioned about the upper two-thirds of the tubular member 340' and not about the lower one-third of the tubular member 340'. In general, this arrangement creates a situation whereby the removal of heat through use of the helical heat exchanger assembly 500 creates conditions where natural circulation causes the fluid within the main body to flow along the paths identified by the arrows in FIG. 3G2.

Advantages of the embodiment reflected in FIGS. 3J1-3J2, include simplification of the design and construction of the assembly 1000 through the elimination of the impeller pumps and the need for equipment to control the pumps; elimination of the need for impeller openings in the lid coupled to the main body 302', thus reducing the number of penetrations that must be made into the main body, and elimination of the need to provide energy for operation of the motors driving the impeller pumps. The minimal penetrations required for implementation of this embodiment is reflected in FIG. 3J3, where only two penetrations 314a' and 314b' into the main body are provided, one for the inflow of a heat exchange fluid for the outflow of heat exchange fluid.

In certain embodiments of the molten salt assemblies 300 described previously one or more solid Thorium fuel rods will be positioned and located within the interior of the tubular member 340 (or 340'). References herein to a solid Thorium fuel rod are intended to indicate that the fuel rod contains solid Thorium (as opposed to Thorium dissolved in a molten salt). As such, a solid Thorium fuel rod, as that term is used herein, may define internal openings or chambers.

In embodiments as described above, Thorium fuel will be available within the interior of the tubular member 340 (or 340') both in the form of solid Thorium within the Thorium fuel rod, but also in the form of dissolved Thorium within the molten salt. FIGS. 4A-4E illustrate one example of a novel Thorium fuel rod 400 constructed in accordance with certain teachings of this disclosure.

Referring to FIGS. 4A-4E a Thorium fuel rod 400, is illustrated that includes an interior Beryllium core element 402 and an outer, solid Thorium-containing fuel element 404. In the illustrated example, the Thorium containing fuel element 404 is formed from a solid Thorium-containing material, such as metallic Thorium. Alternative embodiments are envisioned where the element 404 is formed from a Thorium-containing solid material (such as Thorium Dioxide) and an outer cladding In the example of FIG. 4A-4E, the outer surface of the Thorium fuel element 404 defines a series of fins that may be twisted to form a generally spiral-like outer structure. Alternative embodiments are envisioned wherein the fins on the Thorium fuel element are straight or generally straight.

In the example of FIGS. 4A-4E, the Beryllium core element 402 is formed from a generally tubular element of Beryllium-containing material, such as metallic Beryllium. The generally tubular element is formed from a structure that defines an interior cavity 412 that, at any given cross-sectional point, defines an open cross section roughly in the form of a four-leaf clover surrounding a central circular opening. In the illustrated example, the Beryllium core element 402 has a length that is greater than the length of the solid Thorium fuel element 404 such that the Beryllium core element 402 extends out from the top of the Thorium fuel element. In one embodiment, the length of the Beryllium core element 402 is such that the solid Thorium fuel element 404 can be completely submerged within the molten salt while the top of the Beryllium core element is above the level of the molten salt. In general, the length of the Beryllium core element 402 extends along a majority of the length of the solid Thorium element 404, and preferably along at least 75% of the length of the solid fuel element 404. Embodiments are envisioned wherein the Beryllium core element 404 extends along 100% of the length of the solid fuel element 404.

Figure 4C:
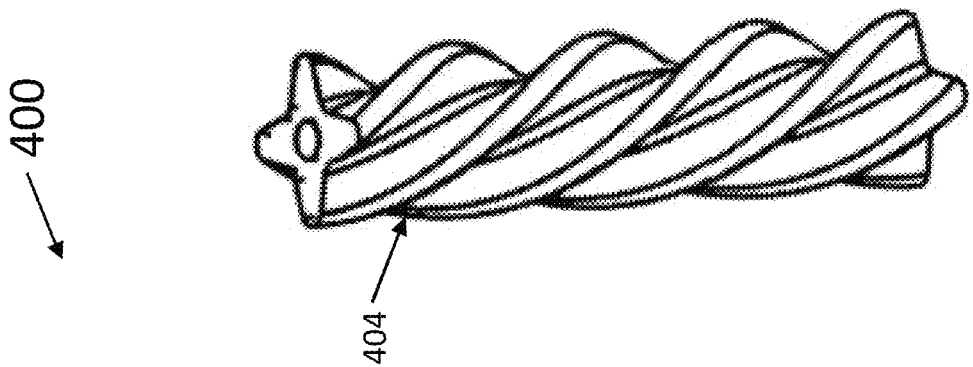
Figure 4B:
Figure 4A:
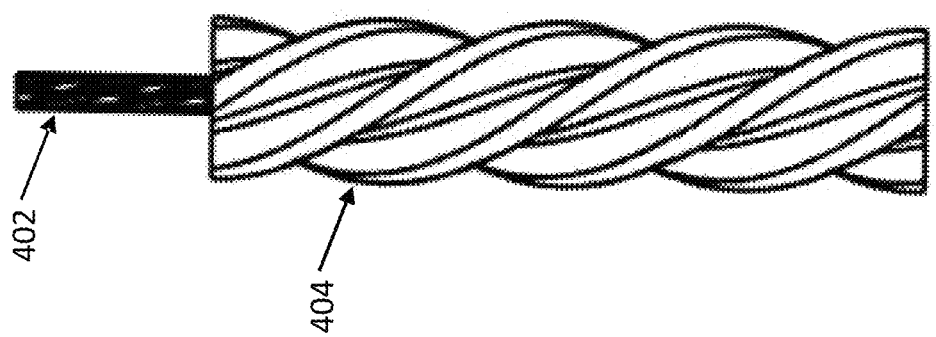
Figure 4E:
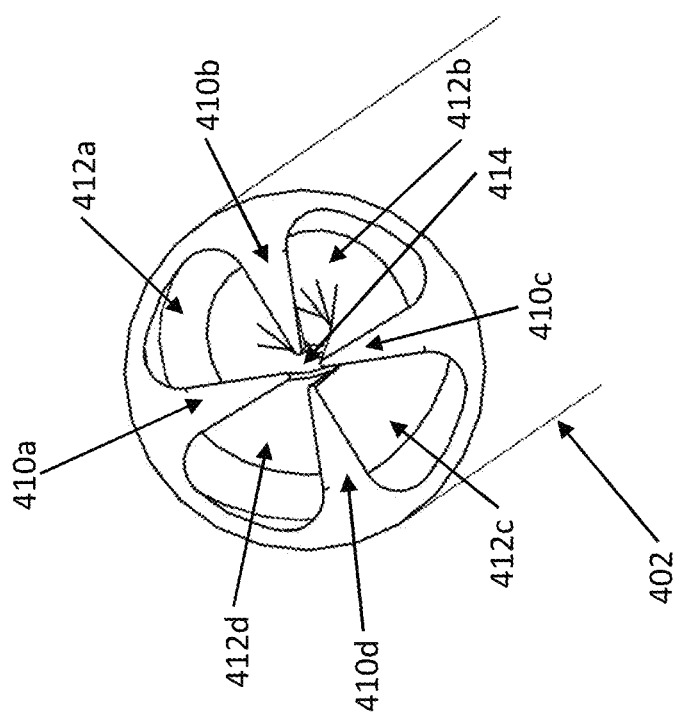
Figure 4D:
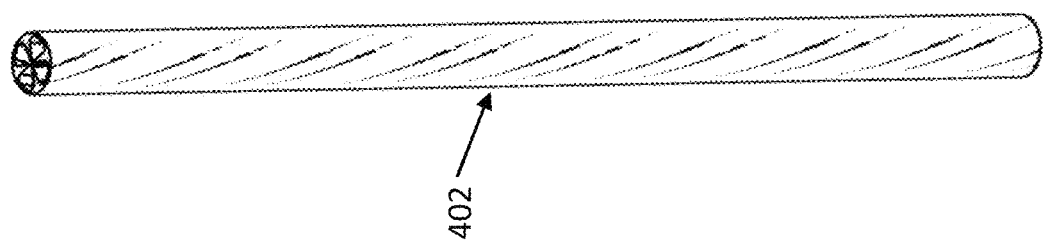

The cross-section of the Beryllium core element 402 at a given exemplary point is roughly reflected in FIG. 4E. As reflected in FIG. 4E, at any given point along the Beryllium core element 402, four solid Beryllium projections (410a, 410b, 410c and 410d) project into the interior of the core and define four lobe-shaped openings 412a, 412b, 412c and 412d and a generally circular central opening 414.

The construction of the Beryllium core element 402 is such that, from the top of the element 402 to the bottom, the relative position of the solid Beryllium projections 412a, 412b, 412c and 412d change such that they form a general spiral down the interior of the core element 402. The result of such a construction is that they define a central cavity 412 having a circular cross-section that extends from the top of the core element 402 to approximately the bottom of the element 402 and generally clover-leaf openings 412a-412d that have the characteristics described below. In the illustrated example, the clover-leaf openings are such that, for any particular cross-section, there is at least a portion of at least one of four of the solid projections from a lower cross section that extend into the openings. This means that particles passing through the openings 412a-412d at any given cross-sectional point will always have at least some solid Beryllium beneath the openings upon which the particles may impinge. In general, the specific pitch of the spiral and the size of the projections and lobe-shaped openings will depend on the amount of power to be generated, the energy of the incident protons, and other factors.

As reflected in FIGS. 4A-4D, the length of the Beryllium core element 402 is greater than the length of the Thorium fuel element 404 such that the core element 402 extends from the top of the solid Thorium fuel element 404.

In at least one embodiment of the present example, the exemplary embodiment of FIG. 4A-4E the interior void space within the Beryllium core will be subjected to a vacuum and the void space of the Beryllium core sealed to maintain a vacuum. The sealing can be done through any suitable end cap provided that the end cap is formed of a material through which the particles provided by the particle beam source 200 can pass. Alternate embodiments are envisioned wherein the top ends of each Beryllium inner core are left open and all the ends are coupled to a manifold assembly that is attached to a vacuum pump to maintain a vacuum within the interior void space of the Beryllium core.

In general, each of the Thorium fuel rods 400 is capable of generating power through fission reaction that can be caused to occur by directing a beam of energetic particles, such as protons with an energy level on the order of above 4.2 MeV into the interior of the Beryllium core. Particles in such a beam may pass into the void space of the Beryllium core and travel until they contact a Beryllium nucleus on one of the surfaces extending into the core. The collision of the high-energy particle (in one exemplary embodiment a proton) with the Beryllium nucleus can result in a (p, n) reaction that produces a neutron having an incident energy level on the order of 1 MeV or greater. One or more of such generated "fast" neutrons can strike a Thorium nucleus within the Thorium element 404 and cause a fission reaction in which the Thorium nucleus undergoes nuclear fission and releases a significant amount of energy.

Depending on the desired operating characteristics of the assembly 1000 one or more of the Thorium fuel rods 400 may be positioned within the tubular member 340. In certain embodiments, the Thorium fuel rods to be positioned within the tubular member 340 are positioned between two support elements and the support elements are configured to rest within the tubular element 340 in such a manner that the solid Thorium fuel elements 404 in the fuel rods 400 are submerged in the molten salt, and the top portions of the Beryllium cores 402 within the fuel rods extend above the level of the molten salt. In these embodiments, the top positions of the fuel rods 400 are all positioned such they are under the window element 316 such that particles from the particle beam provided by particle beam source 200 can pass through the window 316 and into the various Beryllium core elements.

FIGS. 4F1 and 4F2 illustrate an exemplary embodiment in which a single Thorium fuel rod 400 is positioned within the tubular member 340. In the illustrated example, as in the other examples discussed below, the Thorium fuel rod (or rods) 400 are positioned between an upper support element 430 and a lower support element 432. FIG. 4F1 illustrates a top-down view, showing where the Thorium control rod 400 is positioned within the window element 316. FIG. 4F2 provides a generally isometric view indicating the positioning of the assembly containing the Thorium fuel rod 400 relative to the lid 406. In the isometric view of FIG. 4F2—and the isometric views of the other Thorium rod structures discussed in more detail below, the portion of the Beryllium core element 402 that extends out of and above the solid Thorium fuel element 404 is not illustrated but should be understood to be present.

FIGS. 4G1 and 4G2, 4H1, 4H2 and 4H3 illustrate alternate fuel arrangements that include either five Thorium fuel rods (FIGS. 4G1 and 4G2), thirteen Thorium fuel rods (FIGS. 4H1 and 4H2) or seventeen Thorium fuel rods (FIG. 4H3). As reflected in FIGS. 4G1, 4G2, 4H1 and 4H2, in certain illustrated embodiments the Thorium fuel rods to be used in the system are combined in a single solid Modular Thorium fuel package that includes the solid Thorium fuel rods (or rod) positioned between two support elements. The use of such a solid Modular Thorium fuel package can permit efficient refurbishing of the system 1000 described herein for subsequent operations. In addition, the use of a Modular Thorium fuel package as disclosed herein also permits the construction of systems of different power levels through the use of one fuel package in place of another.

As briefly discussed in the previously illustrated embodiments, the Beryllium core elements are used to provide solid targets upon which high energy protons can impinge to generate high energy (for example over 0.7 MeV) neutrons that can strike Thorium to induce a fission reaction within the Thorium nucleus, generating additional high energy neutrons and energy. FIGS. 4G1 and 4G2 illustrate an alternative solid Modular Thorium fuel package in which a different approach is used to generate high energy neutrons for the fast fission of Thorium.

Referring to FIGS. 4J1 and 4J2, a solid Thorium fuel assembly is illustrated that includes four solid Thorium rods (FIGS. 460a-460d) surrounding a single, central solid Beryllium rod 462. In the illustrated embodiment, the central solid Beryllium rod 462 is used as a target in which the high energy particle beam from the particle beam source 200 is projected. When such high energy particles strike the Beryllium rod 462, high energy (fast) neutrons can be generated which can exit the Beryllium rod and impact upon Thorium in the solid Thorium rods (460a-460d) to cause fast Thorium fission reaction.

In the embodiments of FIGS. 4J1 and 4J2 the central Beryllium rod 462 is solid. As such, the particles impinging on the rod from the particle beam source 200 may not penetrate the lower portions of the Beryllium rod 462. To promote such penetration and utilization of the entirety of the Beryllium rod to generate fast neutrons, a Beryllium rod in the general form of the one described above in connection with FIGS. 4D and 4E may be substituted for the solid rod 462. In the embodiments discussed above in connection with FIGS. 4A-4H3 and 4J1-4J2 the Beryllium within the Beryllium rods may be in the form of solid Beryllium. Alternative embodiments are envisioned wherein the Beryllium within the Beryllium rods takes alternative forms, such as a Beryllium-containing salt (e.g., FLiBe). In such embodiments, the Beryllium-containing rods would comprise a vessel capable of containing a molten Beryllium-containing salt.

Referring to FIGS. 1A and 1B and 3H1 and 3H2 a primary heat exchange assembly 500 is shown as extending around the central tubular member 312. The illustrated exemplary primary heat exchanger includes an input pipe 502 and an output pipe 504. The input pipe 502 is coupled to an input manifold 506 (illustrated in FIGS. 3H1-3H2) and the output pipe 504 is coupled to an output manifold 508. Notably, the lengths of the input and output pipes are sufficiently long so as to pass through the top level of the Thorium-containing molten salt, into the gaseous head maintained above the molten salt and potentially through the top lid of the main body.

As reflected in the exemplary figures, a plurality of helically formed coiled pipes 510, ten in the illustrated example, have one end coupled to the input manifold 506 and another end coupled to the output manifold 508. As reflected in the figures, each of the helical pipes 510 winds downwardly around and back up the tubular member 12 from the input manifold to the output manifold 508. The illustrated number of helically formed coiled pipes is exemplary only and a different number of pipes could be used without departing from the teachings of the present disclosure. In the embodiment of FIGS. 1A-1B the primary heat exchange assembly includes a non-Thorium containing molten salt within the pipes 510 and input and output manifolds 506 and 508. As described in more detail below, this non-Thorium containing molten salt is circulated through the primary heat exchanger to remove heat from the Thorium molten salt assembly 300. Pumps (not illustrated) may be used to circulate the non-Thorium containing molten salt.

Select details of an exemplary primary heat exchange assembly 500 are shown in FIGS. 3H1 and 3H2. FIG. 3H2 reflects the construction of an exemplary manifold 506. The illustrated manifold construction may be used for both the input manifold and the output manifold. Referring to FIG. 3H1 in the illustrated example, the manifold includes a box-like main manifold base 560 that defines a single input (or output) opening 562 of a first diameter at the top of the base 560 and a plurality of output (or input) openings 564 of a second diameter at the bottom of the base, only two of which are labeled in the figure. In this embodiment, the second diameter is less than the first diameter. In the illustrated example, the input 562 is to axially offset from each of the plurality of openings 564, such that there is no straight flow path through the first opening 562 and any of the second openings 564. In the illustrated example, there are twelve (12) openings 562. Each of the second openings is coupled to a heat exchange coiled pipe 566.

Use of the exemplary manifold described above permits the use of a plurality of lesser-diameter heat exchange coils (twelve in the example) within the main body 502, while requiring only two penetrations through the main body 502.

In the exemplary embodiment discussed herein, heat generated within the main body 502 will be transferred to the molten salt flowing through the primary heat exchange assembly 500. In the illustrated example, that heat is transferred from the primary heat assembly 500 to a secondary heat assembly 512.

Details of the secondary heat exchanger assembly 512 are shown in FIG. 1B. As reflected in FIG. 1B a secondary heat exchange path 516 is provided and arranged to absorb heat from the primary heat exchange coil. In the example of FIG. 1B, a vapor-forming liquid—such as water or carbon dioxide—is contained within the secondary heat exchange path (or coil) 516 and the piping attached to the secondary heat exchanged coil. A condenser 518 is also provided in the illustrated system as is piping (not labeled) that can transport liquid from the condenser 518 to the input of the secondary heat exchange coil and steam from the output of the secondary heat exchange coil to the input of the condenser.

Not illustrated in FIG. 1A or 1B are pumps that can be used to circulate non-Thorium containing molten salt through the primary heat exchange loop and vapor-producing liquid (such as water or carbon dioxide) through the secondary heat exchange loop.

In the example of FIG. 1, the energy transfer assembly 500 is used to transfer energy from the Thorium molten salt assembly 300 to a power generator assembly 600. High level details of such a system may also be found in FIGS. 1A-1B which reflect the application of the vapor generated by the heat exchange tank 512 to a turbine assembly 602 which, in turn, is coupled to an electric generator 604. In accordance with the general operation of turbine-driven electrical generators, the vapor produced by the energy transfer that occurs within the heat exchange tank 512 is used to drive/turn turbine 602 which turns the rotor of the electrical generator 604, producing electrical power at the output 606 of the electrical generator 604. In the illustrated system the output 606 of the electrical generator 604 is provided to a distribution element which distributes the generated electric power such that the majority of the generated power is provided to a main power output 608 and a portion of the generated power is provided to the power input of the proton generator 201 to drive the particle beam source 200.

Figure 5:
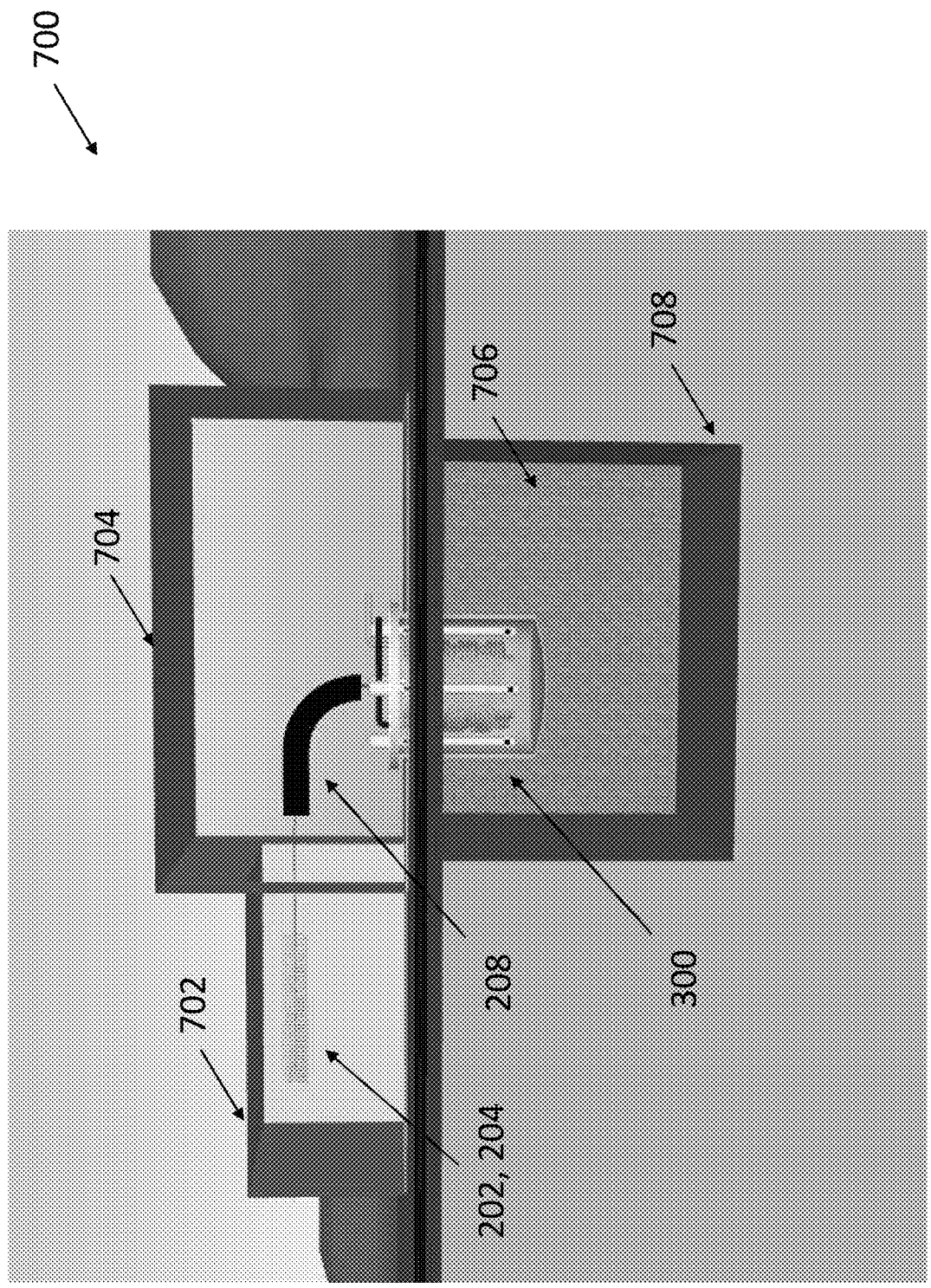
FIG. 5 illustrates an exemplary shielding assembly 700 for use with the exemplary systems 1000 disclosed herein to shield the external environment from particles and rays potentially generated through operation of the disclosed exemplary systems.

Because the operating of the system 100 of FIGS. 1A and 1B can generate nuclear particles and radiation emission, appropriate shielding 700 is provided to block the transmission of undesired particles and waves. FIG. 5 illustrates one exemplary way this shielding may be provided. In the illustrated example of FIG. 5, many of the components of the system 1000 are placed in a containment system 700. In the exemplary embodiment, the containment system 700 comprises a first containment structure 702 in which the particle generator 202 and the vacuum accelerator assembly 204 are located. Vacuum tubes (unlabeled) are coupled to the output of the vacuum accelerator assembly 204 and couple the output of the vacuum accelerator 204 to the forming and steering assembly 208, which is positioned in second containment structure 704. The molten salt assembly 300 is partially placed within the ground under the second containment structure 704 such that the lid of the molten salt assembly is accessible above ground. A third containment structure 708 is provided below the molten salt assembly 300. The space 706 between the molten salt assembly 300 and the third containment structure 708 may be filled with any suitable material, such as soil, borated material, concrete, or any other suitable material or blend of materials. Depending on the particular application of the system 1000, and the extent to which safety requirements dictate, the containment units 702, and 704 may take the form of a simple metallic structure (if the earth, rock or ground structure is capable of providing the desired shielding) or a structure intended to block the transmission of radiation (e.g., lead-walls or a lead-brick structure). The structure 708 should be formed of a material sufficient to contain molten salt in the possibility that there is damage to the molten salt assembly. Alternate embodiments are envisioned wherein the containment unit 700 comprises a structure having an internal dry core area into which the components of system 1000 to be shielded are placed and an external structure capable of holding water (or a water/chemical mix (e.g., borated water) which acts as a shielding material. In any or all the various embodiments of the containment unit 700 a surface layer of shielding material 702 (e.g., a lead blanket) may be used.

In operation, at a very high level, the system illustrated in FIGS. 1A and 1B operates by powering the particle beam source 200 to generate a proton beam that is applied to the Thorium molten salt assembly 300. One or more of the protons within the proton beam may impact upon one or more of the atoms within the Thorium molten salt assembly 300 to either: (a) produce neutrons or (b) result in a nuclear fission reaction, which will generate heat and further neutrons. These generated neutrons may, in turn, impact and interact with other atoms within the Thorium molten salt assembly 300 to generate additional heat. The generated heat may be removed through operation of the primary and secondary heat exchange systems, and the removed energy may be converted to electric energy through use of the electric generation system 600, described above.

The exemplary system 1000 of FIGS. 1A and 1B may be arranged to permit operation of the system in one of several alternative operating modes.

In one operating mode, the proton beam provided by the particle beam source 200 is shaped and aimed such that the proton beam provided by the generator is directed through the window element 316 primarily into the Thorium containing molten salt within the tubular member 302 without a substantial number of the protons (or any) impinging upon the Beryllium cores of the Thorium fuel rods 400 positioned within the tubular member 340.

In this operating mode, one (or more) of the protons from the proton beam from generator 200 may impact one (or more) of the atoms within the Thorium containing molten salt. For example, one or more of the protons from the proton beam may impact with a Lithium nucleus forming part of the molten salt. This interaction of the proton with the Lithium nucleus can cause a (p, n) reaction under which the Lithium nucleus absorbs the incident proton and emits a neutron. The neutrons emitted by such proton-Lithium reactions may be of varying energy levels, the greatest number of neutrons resulting from several such reactions would be at an energy level of between 0.1 and 0.7 MeV. As another example, one or more of the protons from the proton beam may impact with a Beryllium nucleus forming part of the molten salt to cause a (p, n) reaction in which the Beryllium nucleus may absorb the incident proton and produce a neutron at a particular energy level. The neutrons emitted by such proton-Lithium reactions may be of varying energy levels, the greatest number of neutrons resulting from several such reactions would be at an energy level of between 0.7 MeV and just over 1.0 MeV. Notably, the peak energy level of the neutrons emitted by the described proton-Beryllium (p, n) reaction will be greater than those emitted as a result of the described proton-Lithium (p, n) reaction.

In a second operating mode, the proton beam provided by the particle beam source 200 may be shaped and aimed such that all or a substantial portion of the proton beam is directed through the window assembly in such a manner that a substantial number of the protons forming the proton beam are directed to one or more of the Beryllium cores of the Thorium fuel rods within the tubular member 340. This may be accomplished by forming the proton beam into a generally narrow beam shape and directing the narrow beam to the Beryllium core of the central Thorium fuel rod. This may also be accomplished by forming the proton beam into a ring and directing the ring such that it covers either the first group of Thorium fuel rods or the second group of fuel rods. Alternatively, the beam may be formed such that it transitions from a beam directed to the central Thorium fuel rod, to a first ring directed to the first group of fuel rods to a second ring directed to the second group of fuel rods. In general, forming and aiming the proton beam as described in connection with the second operating mode will tend to cause protons within the proton beam to strike Beryllium, thus generating neutrons through the process described above.

In the embodiment of FIGS. 1A and 1B the average energy levels of the protons within the proton beam generated by the particle beam source 200 may be varied, depending on the operating mode of the system to prefer proton-Lithium interactions, thus producing neutrons with average energies below 0.7 MeV or to prefer proton-Beryllium interactions, this producing neutrons with average energies above 0.7 MeV.

For example, when the system is operated in accordance with the first operating mode, the energy level of the protons provided by the proton generator may be set to be on the order of at least approximately 2.4 MeV and about 3.0 MeV. The size and form of the proton beam, along with the energy level of the proton beam and the fact that it is directed into the Thorium containing molten salt, are such that operation of the system in the first operating mode will tend to result in proton production of neutrons of an energy level on the order of between 0.1 MeV and just over 1.0 MeV with the peak energy level of the produced neutrons being on the order of about 0.7 MeV.

In the same example, using the system described above in connection with FIGS. 2A-2D, when the system is operated in accordance with the second operating mode, the particle beam source 200 may be operated to produce a beam of protons where the protons forming the beam have energy levels on the order of 4.5 MeV. The size and form of the proton beam, along with the energy level of the proton beam and the fact that it is directed into the Thorium containing molten salt, are such that operation of the system in the first operating mode will tend result in proton production of neutrons of an energy level on the order of 0.1 MeV-1.2 MeV, with the majority of the produced neutrons having energy levels on the order of between 1.0-1.1 MeV.

The likelihood of the particles from the particle beam 200 interacting with one or more of the atoms within the main body 302 will vary depending on a large number of factors including, but not limited to: the energy level of the particle provided by the accelerator, the particular nucleus involved in the potential interaction, and the other atoms within the body 302. The system 1000 takes advantage of some of these variables, and of the different types of reactions that can occur within the main body 302 to provide a system that can be operated in various modes, to provide various output characteristics.

To understand the various modes in which the exemplary system of the present disclosure may be operated, it is helpful to understand some of the operations that can occur within the body 302.

As briefly discussed above, in the system of FIGS. 1A and 1B, once neutrons are created within the main body 302 (e.g., by a high energy proton provided by the proton beam colliding with a Lithium nucleus or a Beryllium nucleus within the molten salt or as a result of a fission reaction occurring within the main body and producing resultant neutrons) some of the neutrons within the main body 302 may collide with a Thorium nucleus in the molten salt solution and cause a nuclear reaction. In the illustrated system, the nuclear reaction caused by the described collision can be one of at least two different types of reactions. In one type of nuclear reaction, referred to as a "fission" reaction, the nucleus of the involved Thorium atom will split into, typically two, smaller nuclei. Such a fission reaction will release a very large amount of energy and one or more neutrons. The energy released by the fission reaction will tend to increase the amount of energy stored in the molten salt within assembly 300 as heat. One or more of the neutrons released by such fission reaction may interact a Thorium nucleus within the molten salt fuel to cause further Thorium fission reactions.

In a second type of nuclear reaction, known as "neutron capture" (or "neutron absorption") the nucleus of the involved Thorium nucleus will absorb the involved neutron to form an isotope of Thorium, namely Thorium-233 ($^{233}$TH). Thorium-233 is an unstable isotope that will decay to Protactenium-233. The decay of Thorium-233 to Protactinium occurs relatively quickly as the half-life of Thorium-233 is about 22 minutes. Protactenium-233 is an unstable element that will tend to decay to Uranium-233, with the half-life of Protactinium-233 being to approximately 27 days.

Uranium-233 is fissile material. As such, whenever Uranium-233 exists within the molten salt and neutrons are available—either from the particle beam source 200 or from the fission of other atoms within the molten salt—there is the potential that a neutron can strike a Uranium-233 nucleus causing a fission reaction. The fission reaction will produce heat. As with fission of the Thorium nucleus, fission of a Uranium-233 will result in the release of substantial energy and several neutrons, those neutrons may, in turn, interact with a Uranium-233 nucleus within the molten salt to produce a secondary Uranium-233 fission reaction, with a Thorium-232 nucleus to produce a Thorium-233 nucleus, or with other materials within the molten salt assembly 300. Some of the neutrons may pass through and escape the molten salt assembly.

Once started and put into operation, the illustrated embodiment of FIGS. 1A and 1B can be self-sustaining in the sense that it can operate to provide usable energy without the addition of any other external power or energy as long as the energy generated by the system is sufficient to provide the power needed to drive and operate the particle beam source 200.

Once the embodiment of FIGS. 1A and 1B begins to operate, the constituent components comprising the molten salt solution will change over time. At a high level, in certain embodiments, the composition of the molten salt will initially include no, or negligible, Protactinium and no, or negligible, Uranium. For purposes of this disclosure a negligible amount of an element is intended to refer to a substantially non-detectable amount of an element that exists in the absence of any intentional inclusion or addition of the element to the material. Alternate embodiments are envisioned wherein the molten salt could initially contain at least some Uranium.

Figure 6:
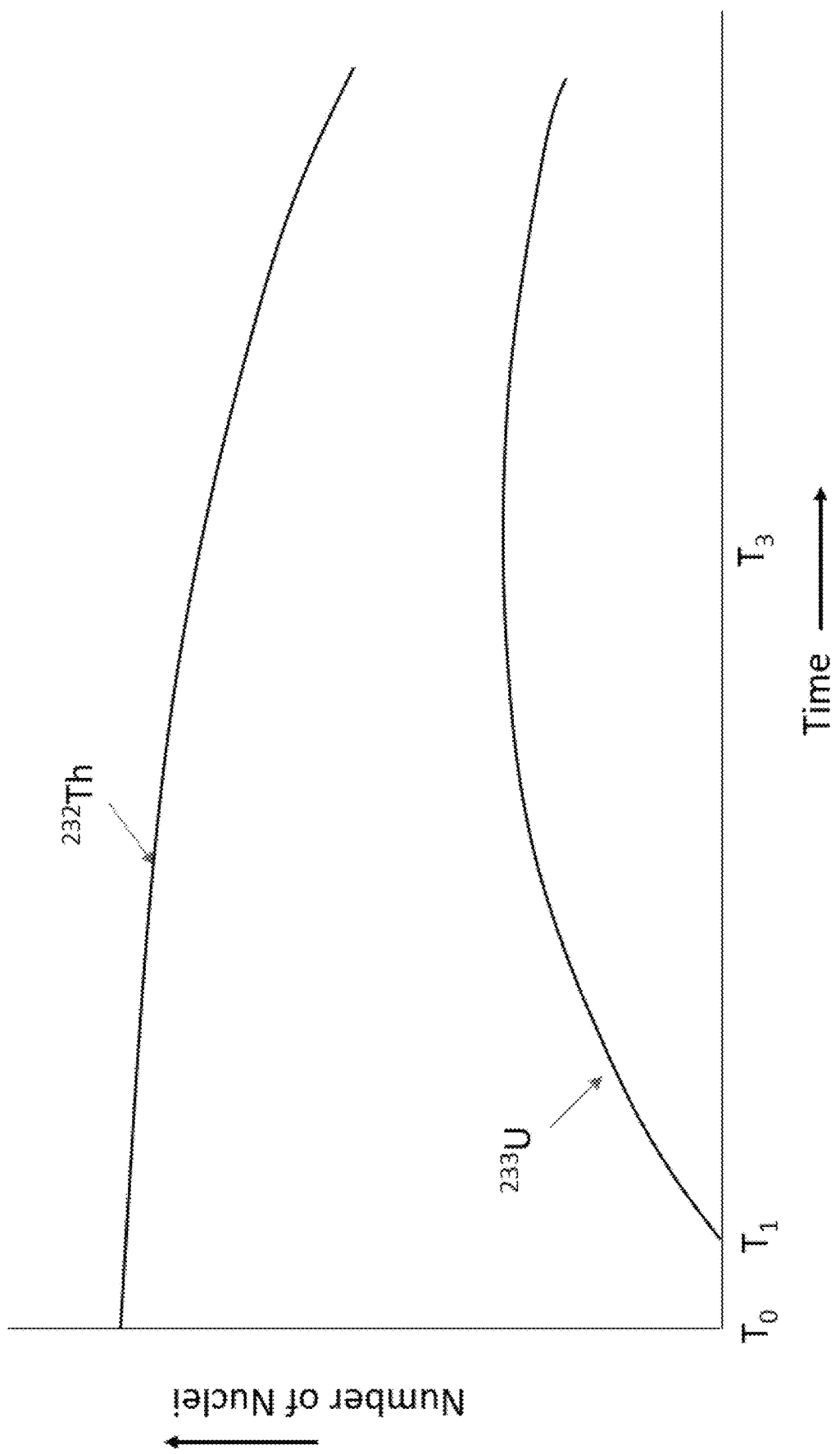
FIG. 6 provides a very crude, approximated, generalized relative indication of the amounts of Thorium-232 and Uranium-233 that can exist for the system of FIGS. 1A and 1B over time if it is assumed that the neutron source provides a relatively constant supply of neutrons.

FIG. 6 provides a very crude, approximated, generalized relative indication of the amount of Thorium-232 and Uranium-233 that can exist for the system of FIG. 1 over time if it assumed that the neutron source provides a relatively constant supply of neutrons.

As reflected in FIG. 6, at a time $T_o$, before the application of any neutrons to the system, the quantity of Thorium in the molten salt will be at its maximum level. As neutrons begin to be applied to the system, some of the neutrons will interact with the Thorium-233 causing one or more of the nuclear reactions discussed above. These nuclear reactions will cause the quantity of Thorium in the molten salt to decrease over time, as reflected by the line $^{232}$Th.

As also reflected in FIG. 6, by the time $T_1$, some of the Thorium that were subjected to a nuclear capture reaction will have converted to Protactinium-233 and some of those Protactinium-233 would have decayed to Uranium-233. As such, the number of Uranium-233 in the molten salt will begin to increase over time starting at time $T_1$.

It should be appreciated that the representation in FIG. 6 is intended to be a very crude approximation of the relative number of Thorium-232 and Uranium-233 in the molten salt and that the actual shape of the represented curves will not necessarily be in line with the specific curve characteristics illustrated in FIG. 6 (and can potentially be controlled as described below).

As those of ordinary skill will appreciate, the likelihood of a nuclear reaction occurring when a specific nucleus is bombarded with a beam of particles having a specific incident energy level, is sometimes described by a concept known as the nuclear cross-section. In general, a nuclear cross-section is a quantity that expresses the extent to which neutrons interact with particles of a given energy level. Nuclear cross-section information may be obtained through consultation of JANIS (the Java based Nuclear data Information System) provided by the Nuclear Energy Agency and accessible at https://www.oecd-nea.org/janis/

FIGS. 7A-7D provide JANIS-generated graph reflecting the cross-sections of various isotopes that may exist within the molten salt assembly 300 of FIGS. 1A-1B.

Figure 7A:
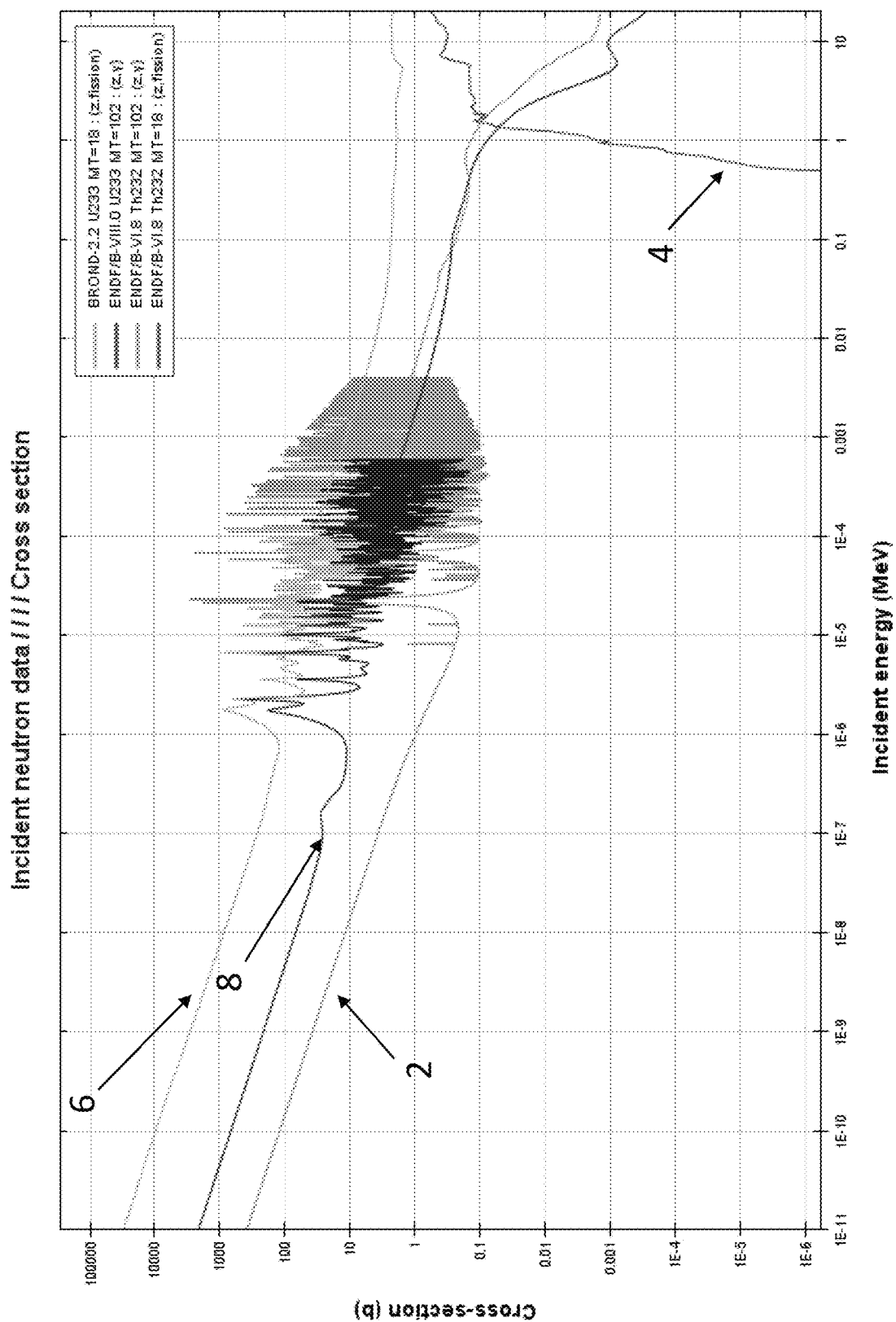
FIGS. 7A-7D provide JANIS-generated graph reflecting the cross-sections of various isotopes that may exist within the molten salt assembly 300 of FIGS. 1A-1B.

Referring first to FIG. 7A, data reflecting the cross-section of Thorium-232 as a function of the incident energy is illustrated for both the absorption reaction, reflected by line 2, and for the fission reaction, reflected by line 4. Also illustrated in FIG. 7A are the fission 6 and absorption 8 cross-sections for Uranium-233 as a function of incident energy. As the graph indicates, for Thorium-232 and Uranium-233, the cross-sections for the absorption and fission reactions vary as a function of incident energy in such a manner that the cross-section values may be considered to lie, for any incident energy level, within one of four regions.

Figure 7B:
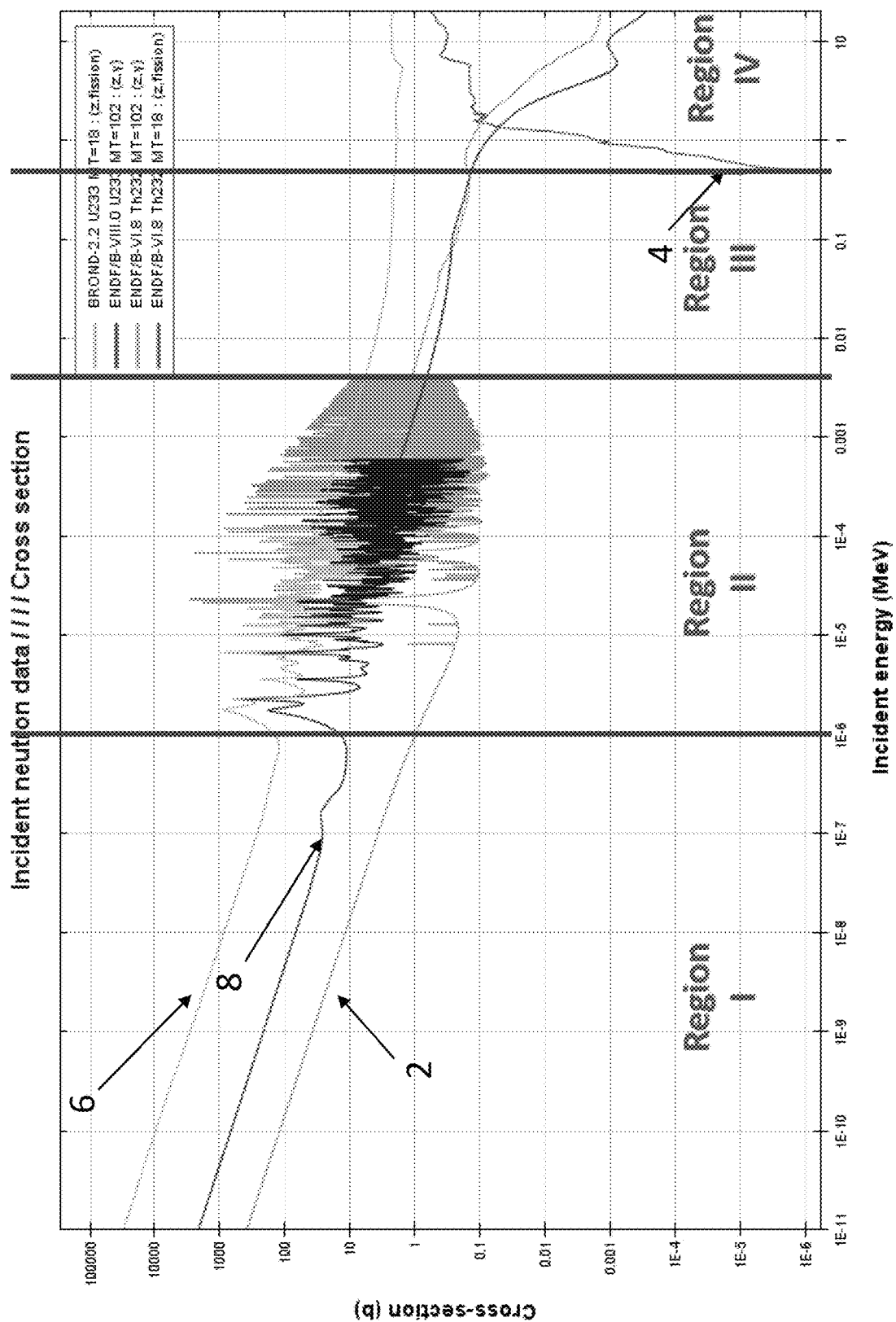
Figure 7C:
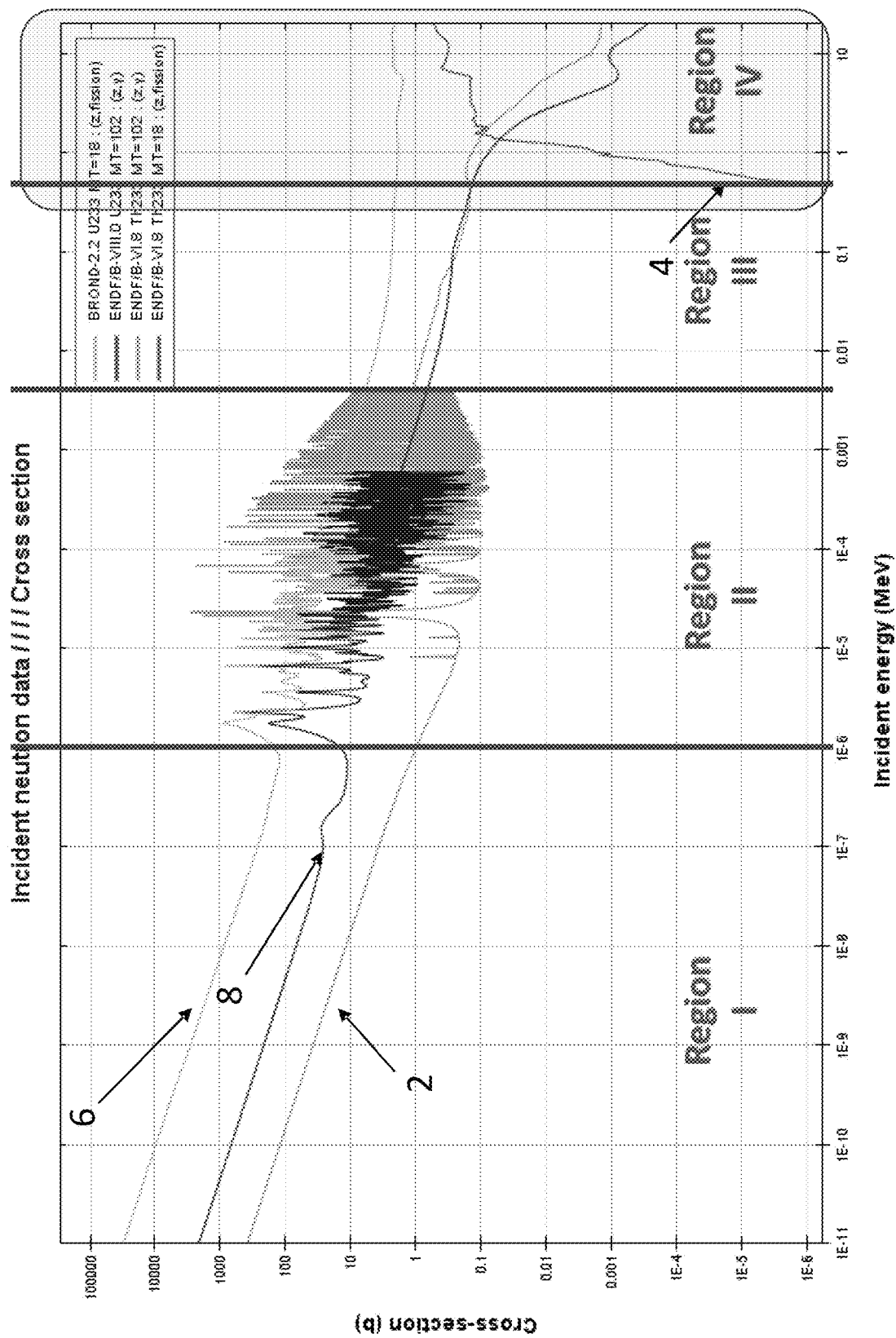
Figure 7D:
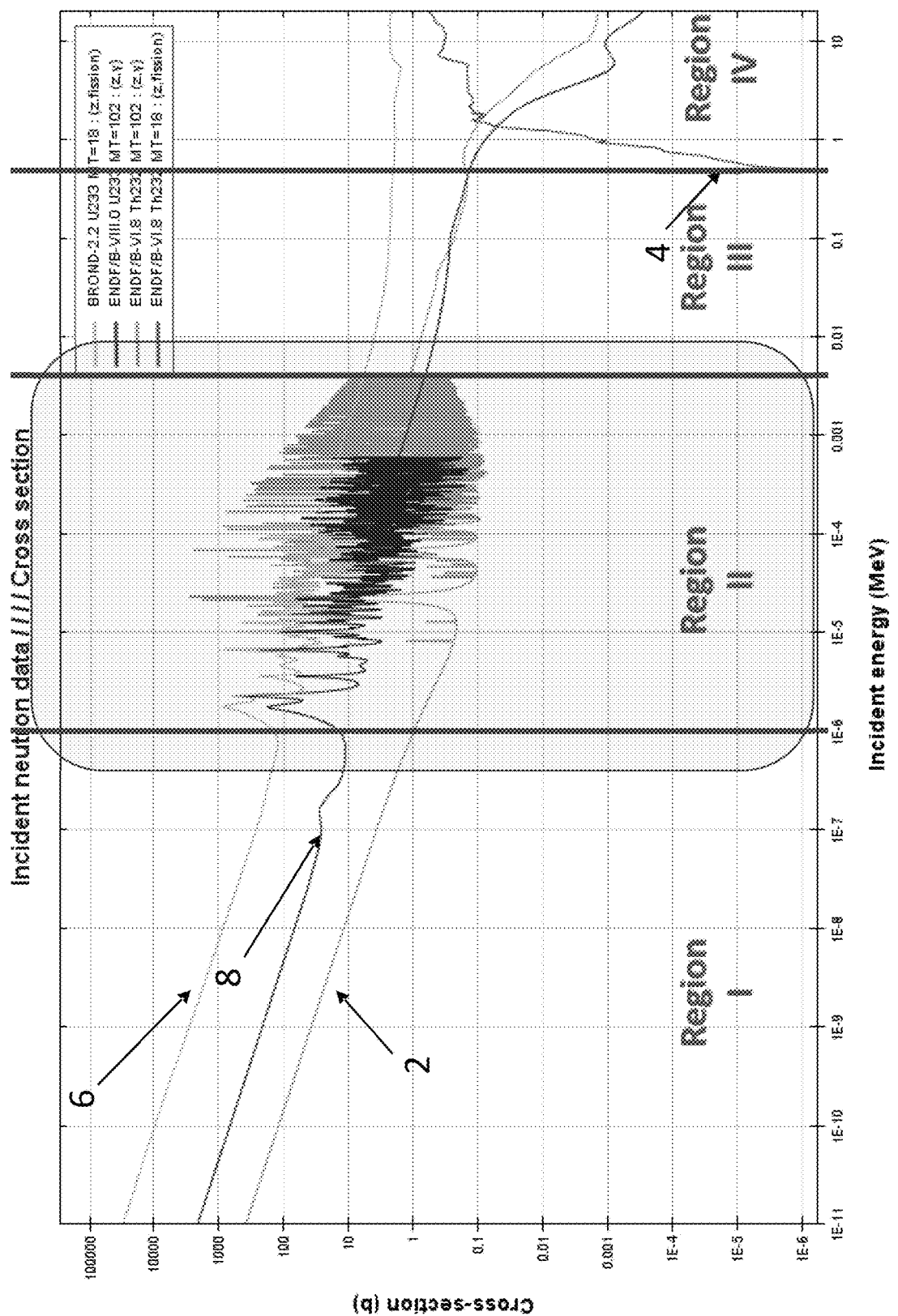

FIG. 7B illustrates the cross-sectional information of FIG. 3A divided into four regions. In the first region, designated by Roman numeral I, the absorption cross-section of Thorium-232 is comparatively large relative to the negligible fission cross section and decreases in a relatively smooth manner with respect to changes in the incident energy level. In that same region, the fission and absorption cross-sections of Uranium-233 exceed the absorption cross-section of Thorium-232. In the example of FIG. 3A, Region I extends from neutron energy levels of roughly $1\times10^{-11}$ to roughly $1\times10^{-6}$ mega electron volts (MeV).

Within the second region, designated by Roman numeral II, the absorption and fission cross-sections of Thorium-233 and Uranium-233 vary substantially in a resonate-like manner with changes in the incident energy level. Over this region there are specific energy levels where the absorption cross-section of Thorium-232 exceeds both the fission and absorption cross-sections of Uranium-233. It may be further noted that, over this region the absorption cross-section of Thorium-232 reaches its maximum value. In the example of FIG. 3A, Region II extends from neutron levels of roughly $1 \times 10^{-6}$ to roughly 0.007 MeV.

Within the third region, designated by Roman numeral III, the absorption cross-section of Thorium-232 continues to remain comparatively large relative to the negligible fission cross-section of Thorium-232. Over that same region, the fission cross-section of Uranium-233 exceeds both the absorption cross-section of Thorium-232 and the absorption cross-section of Uranium-233. In the example of FIG. 3A, Region III extends from neutron levels of roughly 0.07 MeV to roughly 0.8 MeV.

Finally, within the fourth region, designated by Roman numeral IV, the fission cross-section of Thorium-233 is comparatively large relative to its absorption cross section, and both the fission and absorption cross-sections of Thorium-232 vary in a roughly smooth manner with variations in the incident energy level. Over this same region, the fission cross-section of Uranium-233 exceeds the fission cross-section of Thorium-233 and the absorption cross-section of Uranium-233.

The system of FIGS. 1A and 1B takes advantage of the different cross-sections of the various atoms that will exist within the Thorium molten salt assembly 300 to implement a novel operational and control scheme wherein the incident energy level of the particles provided by the particle beam source 200 are varied over time to adjust the operating state of the molten salt system such that the energy provided by the system is predominantly generated by fission of Thorium-232 at certain times, predominantly by fission of Uranium-233 at other times, and—potentially—fission of both Thorium-232 and Uranium-233 at other times. Examples of how such a novel operating method may be implemented are generally reflected in FIGS. 7A-7E.

At an initial time, the system of FIGS. 1A and 1B is operated such that the incident energy level of the neutrons provided by particle beam source causes operation of the system in Region IV. This operating region is highlighted in FIG. 7C. This will be accomplished by controlling the energy level of the particles provided by the particle beam source 200 such that they are at a sufficiently high level that interaction between such particles and the Beryllium within the molten salt can result in the generation of neutrons having energy levels within the level of the neutrons within Region IV (i.e., over about 0.7 MeV). During this period of operation, given the small quantity of Uranium-233 in the molten salt assembly 300, the energy generated by the system 1000 will be predominantly generated through fission of Thorium-232. However, as reflected in FIG. 7C, such operation will also result in a non-trivial number of absorption reactions involving Thorium-232, which will ultimately result in the formation and buildup of Uranium-233 in the system 300.

As the number of Uranium-233 atoms in the system increases, a point will be reached where the level of Uranium-233 is such that fission of Uranium-233 would be enough to provide the desired output power. At that point, the system of FIGS. 1A and 1B 1 can transition to operate in Region II, by adjusting the incident energy level of the provided proton beam to a level where it will tend to cause interactions between the incident protons and the Lithium within the molten salt assembly such that neutrons having energy levels within Region III are generated by proton-Lithium (p, n) reactions (i.e., neutrons with energy levels between about $1 \times 10^{-6}$; to 0.007 MeV). Operation in this region, provides neutrons wherein fission of Uranium-233 is possible, but the fission of Thorium-232 as the result of neutrons generated as a result of bombardment of particles from the particle beam source 200 is negligible. In that same region, the neutrons within the molten salt assembly 300 will—in addition to causing fission reactions of Uranium-233, also cause absorption reactions involving Thorium-232, thus providing a source of Uranium-233 for sustained operation. The system can then operate in Region III for a sustained period of time, providing the desired power output until the number of Uranium-233 atoms in the system is inadequate to support the desired power output, or until other conditions warrant a change in the operation of the system or system shut down. Operation in this Region is reflected by the highlighted portion on FIG. 7D.

FIGS. 8A-8H illustrated examples of how the particle beam from the particle source 200 may be directed, shaped and controlled to operate the exemplary systems described herein within the various Regions discussed above in connection with FIGS. 7A-7D.

As described above, in the exemplary systems under discussion particle beam source 200 may be used to generate particles (such as protons) having incident energy levels of above 4.5 MeV when the generation of neutrons having energy levels of above 0.7 MeV through a (p, n) reaction of the incident particles and Beryllium, and the direct fission of Thorium, is desired.

Figure 8C:
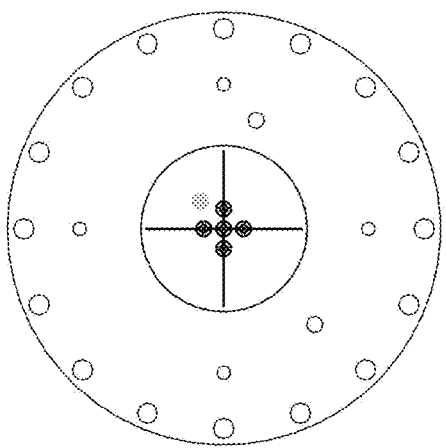
FIGS. 8A-8H generally illustrate how the particle beam source 200 of FIGS. 1A and 1B may be used to generate particles, such as protons, having first or second energy levels and the direction of those particles to various locations within the molten salt assembly 300 of FIGS. 1A and 1B.
Figure 8B:
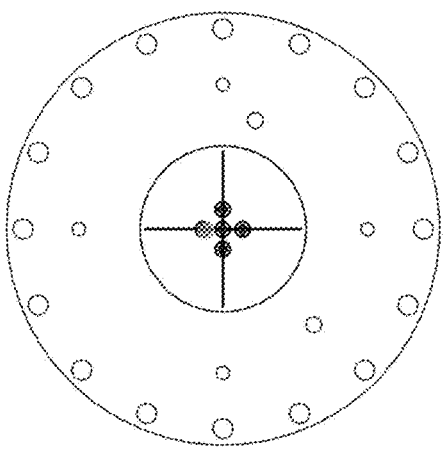
Figure 8E:
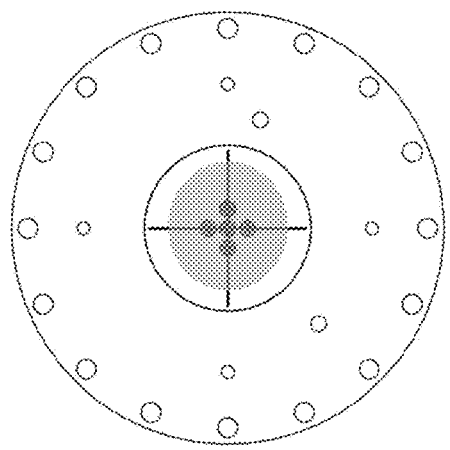
Figure 8A:
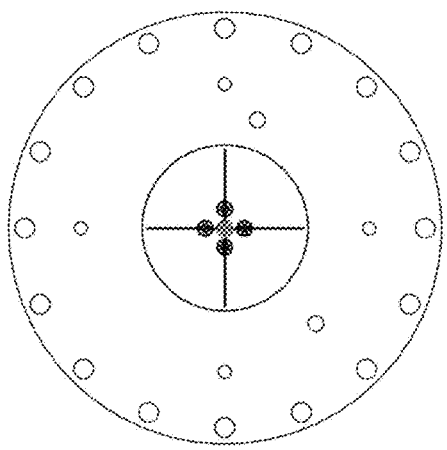

FIG. 8A, illustrates an example of system 1000, from a top-down perspective, that uses five Thorium fuel rods where of the Thorium fuel rods includes a Beryllium core generally as described above in connection with FIGS. 4A-4D. In the example of FIG. 8A, the proton beam provided by the particle beam source 200 is a solid beam spot concentrated on the Beryllium core of the central Thorium fuel rod. As such the incident high energy protons will potentially collide and interact with Beryllium within the Beryllium core, producing a (p, n) reaction that results in the generation of relatively high-energy (sometimes referred to as "fast" neutrons). These generated "fast" neutrons can then interact with a Thorium nucleus in the solid Thorium fuel element surrounding the Beryllium core to cause a Thorium fission reaction to occur which, in turn, will generate more fast neutrons that can cause further Thorium fissions to occur.

FIG. 8B illustrates a similar situation, but this time with the high energy proton beam from the proton beam source 200 being directed to the Beryllium core of the Thorium fuel rod at the top of the image. As will be appreciated, using the approach of FIGS. 8A and 8B, a beam spot of particles of the appropriate type and energy level (e.g., protons with energy levels at or above about 4.5 MeV) provided by the proton beam source 200 and the proton beam may be directed to the Beryllium cores of each of the Thorium fuel rods in the system individually. Thus, by applying the beam for a limited period to each of the Beryllium cores, a supply of fast neutrons can be provided for each of the solid Thorium fuel elements to maintain at least some level of Thorium fission within the system. This energy released by such Thorium fissions can be used to operate the system.

FIG. 8C reflects an alternate way the system 1000 can be operated to provide fast neutrons and to produce Thorium fissions. In the example of FIG. 8C, the high energy particle beam from the particle beam source 200 is focused at a spot within the molten salt within the molten salt assembly 300. Because at least some of the particles from the beam will have energy levels in excess of 4.5 MeV, the particles can strike a Beryllium within the molten salt, thus causing a (p, n) reaction and producing a fast neutron that can, in turn strike a Thorium atom within the molten salt or within a solid Thorium fuel element (if present) to cause a Thorium fission reaction.

Figure 8D:
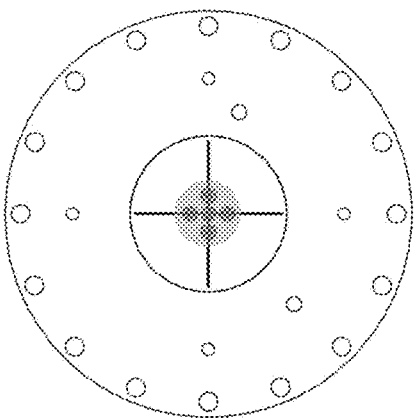

FIGS. 8D and 8E illustrate still other alternate approaches for producing fast neutrons and inducing Thorium fission reactions. In these examples, the beam size of the high energy particle beam from the particle beam source 200 is adjusted such that some of the particles comprising the high energy beam will impinge on both the Beryllium core of one or more Thorium fuel rods (thus producing fast neutrons and inducing Thorium fissions as generally described in connection with FIGS. 8A and 8B) and others may impinge upon Beryllium atoms within the molten salt in the assembly 300 (thus inducing the generation of fast neutrons and Thorium fission as described above in connection with FIG. 8C).

Still further alternate embodiments are envisioned wherein the high energy particle beam provided by the particle beam source 200 is "strobed" from a small diameter beam spot (as generally illustrated in FIG. 8A) to a larger diameter beam spot (as generally illustrated in FIG. 8E) to vary the manner in which fast neutrons are generated.

Figure 8H:
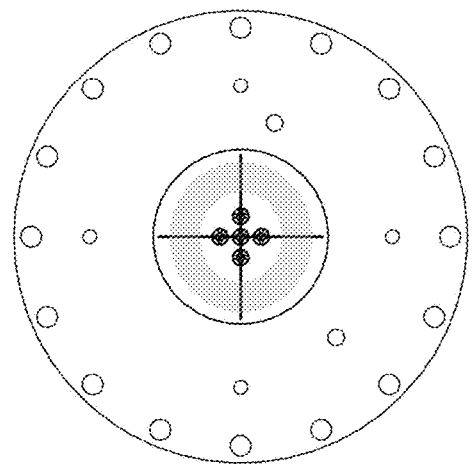
Figure 8F:
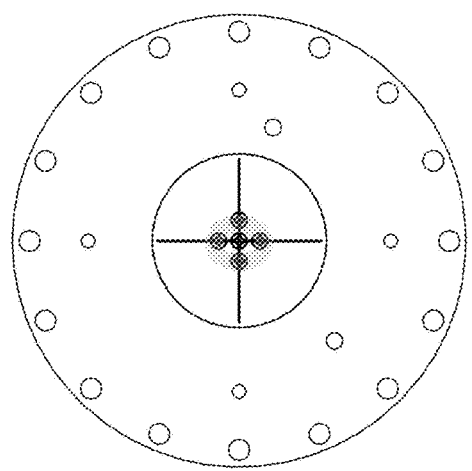
Figure 8G:
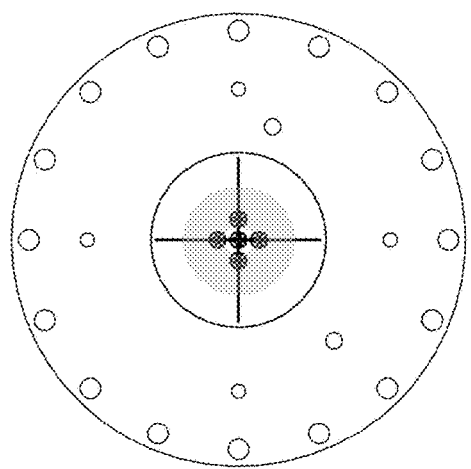

FIGS. 8F-8H illustrate yet another alternate mode of generating fast neutrons. In this mode, the particle beam from the particle beam source 200 is configured to a have a ring shape and the dimension and direction of the provided ring is varied to impinge upon the Beryllium cores of the Thorium fuel rods within the system and/or the molten salt within the assembly 300.

It should be noted that, while the above discussion focused on the manner in which fast neutrons may be generated and the fast fission of Thorium induced, operation of the system as described above will also result in a number of different nuclear reactions including the generation of neutrons having lower energy levels (sometimes referred to as "thermal" neutrons) and the fission of any fissionable materials (Uranium-233 for example) that may exist within the assembly. This is because the neutrons generated within the assembly (either through reactions involving a particle from the particle beam source 200 or as the result of fission reactions within the assembly) will be of various energy levels, such that—while proton-Beryllium (p, n) reactions, proton-Lithium (p, n) reactions (generating neutrons with lower, potentially thermal, energy levels) will be occurring, as will fission reactions of Thorium and, likely, fission reactions of Uranium-233 (if present). Absorption reactions will also be occurring, as will non-reactions where some of the generated neutrons simply escape the assembly without producing any nuclear reactions within the assembly. Moreover, neutrons generated with "fast" energy levels will tend to have their energy levels reduced as they pass through the materials and elements within the assembly 300 (such as the molten salt) such that they will become thermal neutrons that can be involved in a Uranium-233 fission operation or a Thorium-232 absorption operation.

Operation of the system as described above, however, to direct high energy particles (specifically protons) at energy levels sufficient to produce a Beryllium (p, n) reaction will tend to promote the generation of fast neutrons and the direct fission of Thorium within the assembly 300.

FIGS. 8A-8H (and primarily FIGS. 8C-8E) also illustrate how the exemplary systems described herein may be operated to promote the generation of thermal neutrons and Uranium-233 fission reactions. By operating the particle beam source 200 to provide particles (such as protons) with energy levels of between about 2.5 MeV and 4.5 MeV, a situation may be created wherein proton-Lithium (p, n) reactions are promoted. These reactions will tend to produce neutrons having an energy level below the fast neutrons generated by a Beryllium (p, n) reactions. These neutrons will typically be at a level below that require for Thorium fission, but at a level where they can be involved in both a fission reaction involving a Uranium-233 reaction, or an absorption reaction in which Thorium-232 is ultimately converted into Uranium-233. Thus, by operating the system 1000 in this manner, Uranium-233 fissions may be promoted. Again, it should be noted however that, because any fission reactions involving of Uranium-233 or Thorium-232 that occurs during a time when the lower energy particles (such as protons) from the particle beam source 200 are provided to the assembly 300 will produce fast neutrons that can result in a fission reaction involving Thorium-232, such that fission reactions involving Thorium-232 can occur within the assembly 300 alongside fission reactions of Uranium-233.

Considering the above, it should be clear that the novel system 100 described herein can, by adjustment of the energy level of the particles provided by the particle beam source 200, and by controlling the direction and shape of the provided particle beam, be operated in manner to promote: (i) generation of fast neutrons and the direct fission of Thorium (when high energy particles (such as protons with energy levels above 0.7 MeV) are provided) and (ii) generation of thermal neutrons with energy levels below 0.7 MeV and the fission of Uranium-233.

Figure 9B:
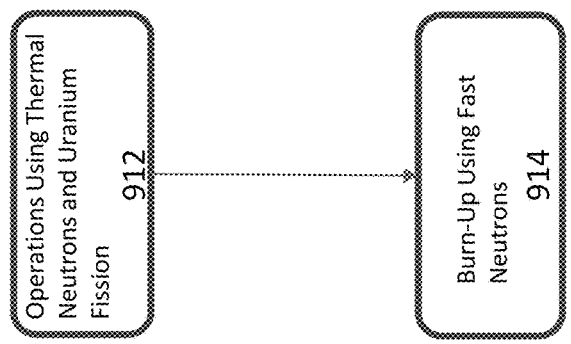
FIG. 9B illustrates a method by which the exemplary system 1000 described above may be operated to reduce the amount of undesirable waste in the system through a burn-down process.
Figure 9A:
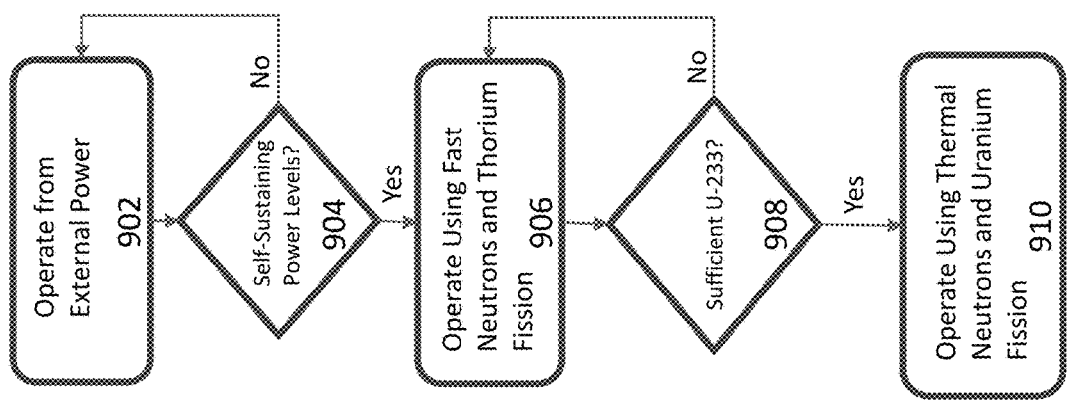
FIG. 9A illustrates one exemplary method of operating a system 1000 constructed in accordance with the teachings of the present disclosure to initially promote the generation of fast neutrons and fission of Thorium (Thorium-232) and thereafter to promote the generation of thermal neutrons and the fission of Uranium (Uranium-233).

FIG. 9A illustrates one exemplary method of operating a system 1000 constructed in accordance with the teachings of the present disclosure.

Over a first initial time period 902, the system will be operated from an external power source (such as a diesel generator) that will provide the input power to the particle source 200. Over this time period, the system 1000 can be operated to promote the generation of fast neutrons and the direct fission of Thorium through the generation of a high energy particle beam and the direction of that particle beam to the Beryllium cores of any Thorium fuel assemblies within the system 1000.

Over this time period, the output energy level of the system can be monitored at a step 904. Once it is determined that the energy being produced by the system is adequate to provide power necessary to power the particle beam source 200, the external power source can be removed, and the system can begin to operate without the addition of any external power.

After the system begins to operate without the provision of external power, it can continue to operate in accordance with Region IV, described above, where direct fission of Thorium is promoted and used to provide a desired level of energy output. This is reflected by operating step 906. As described above, over this period, Uranium-233 will begin to be produced within the assembly.

At step 908, the level of Uranium-233 in the assembly can be monitored and, when it is determined that the quantity of Uranium-233 in the assembly is sufficient to support the desired energy level output through fission of Uranium-233, the operation of the particle beam source 200 can be adjusted to provide particles (such as protons) of a lower energy level to promote Uranium-233 fission reactions in a Region II operation. Notably, over this region, Uranium-233 will continue to be produced as the result of the Thorium-232 absorption reaction occurring within the system. Operation in this mode is reflected by step 910.

It is anticipated that the systems 1000 described herein can be operated as described above for Step 910 for most of its operating time, for example over a period of between 5-10 years.

Of note, in embodiments where the molten salt does not include Beryllium (for example when the molten salt is FLiNaK, the generation of fast neutrons through use of the particle beam source 200 will be through bombardment of the Beryllium cores within the Thorium fuel rods.

In addition to producing desired energy (and generating Uranium-233 for later use) operation of the system 1000 in accordance with a Region IV moderation can beneficially reduce (or "burn up") undesirable waste elements that could otherwise build up within the assembly 300.

In general, nuclear fission reactions typically result in the production of by-products generally known as fission products. Certain fission reactions, such as the fission of Uranium-233 can result in the production of fission products in the form of actinides, including trans-uranium (TRU) actinides, and other long-lived fission products. In general, such by-products are undesirable because they typically emit relatively high amounts of radiation and have relatively long-half-lives. The handling, disposing and processing of such TRUs and long-lived fission products is subject to various regulations and safe-handling precautions that must be followed when dealing with such materials.

Many TRU's and long-lived fission products can be broken down into elements and isotopes that are less radioactive and/or have substantially shorter half-lifes such that they are safer to handle than the original fission products. Such TRUs and long-lived fission products can be broken down though interactions with neutrons having certain incident energy levels, typically those on the order of the "fast" neutrons, whose generation can be promoted through operation of the system as described above. Thus, operation of the system in a manner where generation of "fast" neutrons is promoted to reduce the amount of undesirable waste in the system.

The exemplary system 1000 described above may be operated in various ways to reduce the amount of undesirable waste in the system. One exemplary operation is reflected in FIG. 9B. In this operational mode, the system can be operated as described above in connection with FIG. 9A for most of its operating life. This operation is reflected at Step 912. Towards the end of its operating cycle, however, the system 1000 can be transitioned to operate in the manner described above, where the generation of fast neutrons is promoted. This is reflected in Step 914. The system 1000 could then be operated at this Step 910 until the desired reduction of waste produces has occurred.

Note, that embodiments are envisioned where the "burn-up" Step 914 is accomplished at a location separate from, and using a particle beam source, different from the location at which the main running Step 912 occurs. For example, embodiments are envisioned wherein a system 1000 constructed in accordance with the teachings of this disclosure is operated for a lengthy period of time at a location where energy generation is desired and then the Thorium assembly 300 is removed and taken to a different location where it can be bombarded with high energy particles that result in the generation of fast neutrons for purposes of waste burn up.

In accordance with other embodiments, the systems 1000 described to herein may be operated to "burn-up" waste materials during the main period of operation of the assembly. Such embodiments are particularly suited for applications where the energy output demands from the system are not constant. For example, if the system of FIGS. 1A-1B is used to generate electricity, the demand for electricity may vary depending based on time, day, month, or weather conditions. For example, if the system of FIGS. 1A-1B is used to power a remote manufacturing plant, the plant may be operational—and thus have high energy demands—only weekdays during normal business hours or only during certain peak months of the year. In such applications, after an amount of Uranium-233 has been generated that is sufficient to provide the desired power output, the system could be operated in Region II during the periods of high energy demand (such that the production of energy though fission of Uranium-233 is maximized) and then be operated in Region IV during periods of low energy demand, such that the high-energy neutrons generated by the system during such operational periods can be used to burn some of the TRUs and long-lasting fission products within the system, thus reducing the total overall waste produced by the system.

Figure 9C:
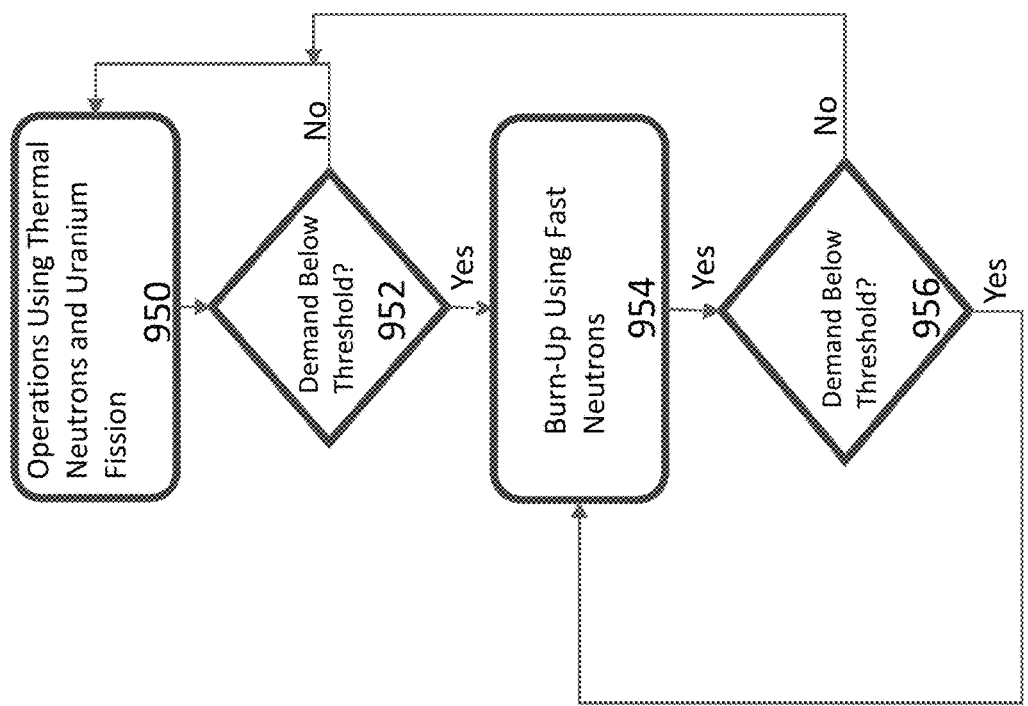
FIG. 9C illustrates a method by which the exemplary system 1000 disclosed herein can be operated during the periods of high energy demand to maximize production of energy though fission of Uranium-233 and, during periods of low energy demand, operated to promote the generation of fast neutrons to burn-up of undesirable waste in the system.

This mode of operation is generally discussed in FIG. 9C.

Referring to FIG. 9C, the system may initially be operated in accordance where the generation of thermal neutrons and the fission of Uranium-233 is promoted as discussed above at Step 950. During these intervals, the energy demand of the system can be monitored at Step 952. If the output demand of the system is not below a certain threshold (or in alternate embodiments if the output demand is above a certain threshold level), the system will continue to operate in a manner where thermal-neutron production and Uranium-233 fission is promoted. If the energy demand, however, is below a certain threshold (and, potentially predicted to based on data to remain at that lower level for a particular period time) the operation of the system can be adjusted to promote the generation of fast neutrons and the potential burn-up of undesired waste. This is reflected in Step 954.

While operating within Step 954, the output demands of the system can be monitored (at Step 956) and, if they increase, the system can transition back to operating in the manner described above in connection with Step 950.

In the embodiments described above, the system 1000 is designed (and the particle beam source 200) operated so that the system—not including the neutrons generated as a result of the operation of the particle beam source 200—is operated in a sub-critical manner. As used herein, operation of the system in a sub-critical manner means that, if the power to the particle beam source is removed such that the particle beam source provides no particles to the system, the number of neutrons generated within the Thorium molten salt assembly 300 as the result of fission or other nuclear reactions will be insufficient to sustain permanent and on-going fission reactions within the system. As such, in the embodiments described above, substantial nuclear fission reactions within the system will ultimately cease if the particle beam source ceases to operate. This sub-critical operation of the described systems is believed to provide a safety margin that can eliminate (or at least substantially reduce) the potential for an uncontrolled series of nuclear reactions (sometimes referred to as a "meltdown") of the assembly 300.

In the embodiments discussed previously in this disclosure, the neutrons relied upon to support the nuclear reactions desired for system operation were generated within the Thorium molten salt assembly 300. Alternate embodiments are envisioned wherein the neutrons relied upon for operation on of the system are primarily generated outside the assembly 300.

Figure 10:
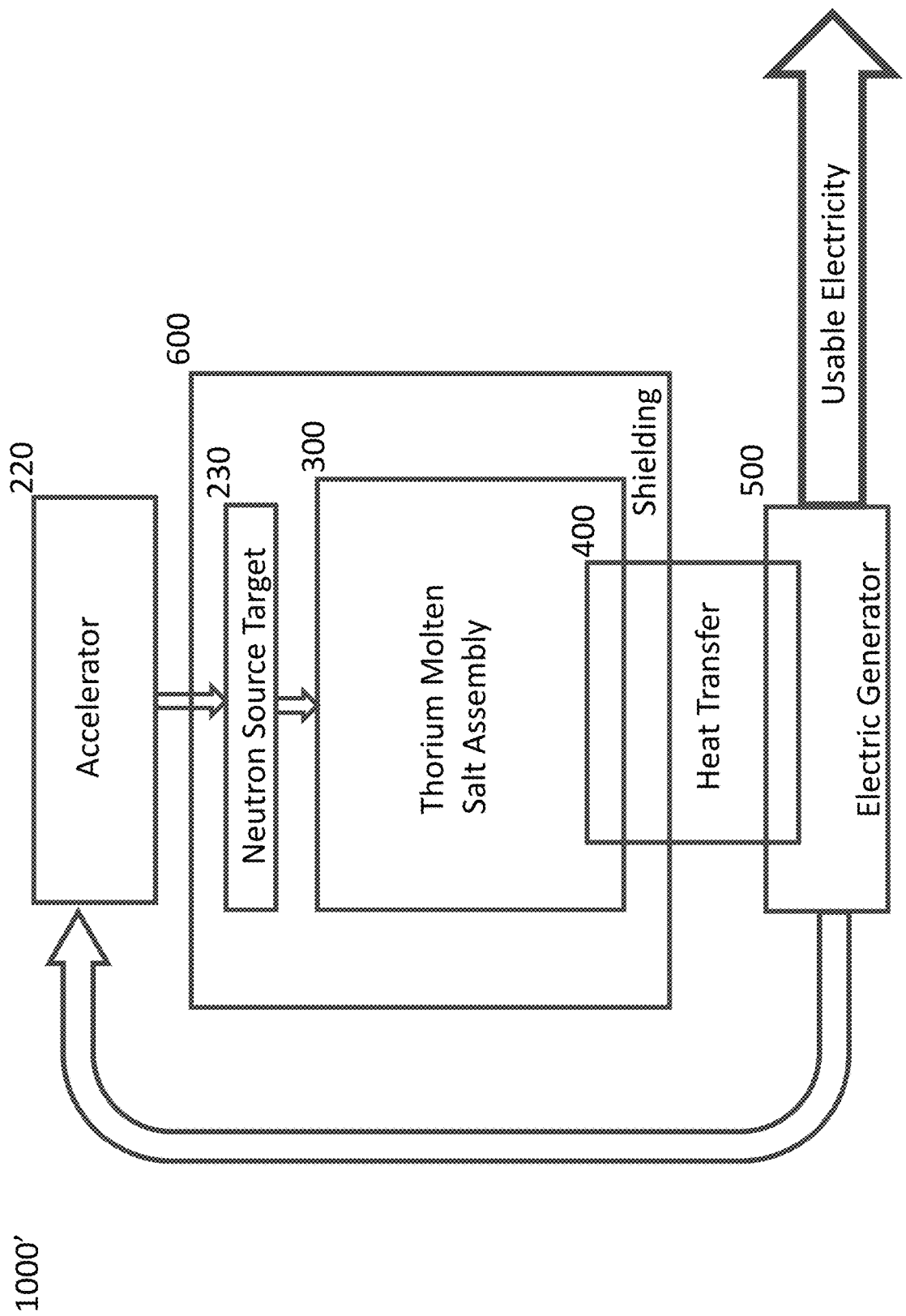
FIG. 10 illustrates an alternate embodiment of the system 1000 of FIGS. 1A and 1B in which fast and/or thermal neutrons desired for operation of the system are generated outside of the molten salt assembly 300.

FIG. 10 illustrates one of many alternate embodiments of the system 1000 of FIGS. 1A and 1B in which fast and/or thermal neutrons desired for operation of the system are generated outside of the molten salt assembly.

Referring to FIG. 10, the alternate embodiment includes a particle beam source 200, a Thorium molten salt assembly 300, a heat transfer assembly 400, a generator 500, and a shielding assembly 600 substantially as described above. The system 1000' also includes, however, a neutron source target 230. As described in more detail below, in this alternate embodiment, the neutron source target 230 comprises one or more elements that are bombarded with the particle beam from the particle beam source 220 and that, in response, generates neutrons having various desired energy levels.

FIGS. 11A-11F illustrate exemplary neutron source targets 230 that may be used in connection with the embodiment of FIG. 10. For purposes of the following discussion, it is presumed that the particle beam source 200 is as described above in connection with FIGS. 2A-2D in that it can generate protons having energies at two levels, where the first energy level is above 4.5 MeV and the second energy level is between about 2.5 MeV and just below 4.5 MeV.

Referring first to FIG. 11A, an exemplary neutron target source 252 is illustrated that comprises a core of neutron reflecting/shielding material (such as graphite) 254 defining an opening passing therethrough and a neutron-generating target 256 positioned within the opening. FIG. 11A illustrates the cross-section of such a structure. In operation, particles from the particle beam source 200 (protons for example) enter the core and pass through the opening on the core and strike the neutron generating target 256. The interaction between the high energy proton beam and the target generates one or more neutrons that pass through the opening within the core and out of the neutron generator 252 where they can be provided to the Thorium molten salt assembly 300 to produce reactions as generally described above.

The neutron generating target 256 can take the form of any target that includes a material that, when struck by highly energized particles, emits neutrons. In the example of FIG. 11A the neutron generating target 256 comprises a cone coated with a sufficient amount of Lithium (Li) such that the interaction with the Lithium on the cone with the incident proton beam provided by the particle beam source 200 will cause a Lithium (p, n) reaction producing neutrons at a generally thermal energy level. FIG. 11B illustrates such a Lithium cone 256.

When the neutron generating target 256 is Lithium, the incident energy level of the proton beam provided by the accelerator should be greater than about 2.4 MeV to generate the desired neutron density for operation of the system 1000'. As such, the embodiments of the accelerator discussed above that can generate proton beams on the order of 3 MeV can be used with the neutron generating target of FIG. 11B.

In the embodiment of FIG. 11B bombardment of illustrated neutron generating target 256 with a proton beam greater than or about 2.4 MeV will result in the generation of neutrons having an energy level of between roughly about $1 \times 10^{-5}$ and 0.07 MeV. Neutrons at such an energy level can be applied to the Thorium molten salt system 300 to cause the reactions discussed above during periods where the generation of thermal neutrons is promoted (e.g., fission of Uranium-233).

FIG. 11C illustrates an alternative neutron generating target 258. In general, the alternate neutron target 258 is like that of target 256, but it contains Beryllium, instead of Lithium. The target 258 operates generally as described with respect to the target 256, with the exception that the impingement of high energy particles on the Beryllium of target 258 will cause the generation of neutrons having a generally higher energy level than the neutrons generated using the Lithium target 256 of FIG. 11B. In general, the neutrons generated through bombardment of the Beryllium target of FIG. 11C will have an energy level in excess of 0.7 MeV.

In the embodiment of FIG. 11C, when the Beryllium target 258 is used the incident energy level of the protons applied to the target should be in excess of 4.5 MeV. The various particle accelerators discussed above in connection with FIGS. 2A-2D would be suitable to provide protons of such an energy level.

In some embodiments of the system of FIG. 10, it will be desirable to simultaneously provide neutrons having different energy levels and, specifically at energy levels around those using the Lithium target 256 described above and the Beryllium target 258 described above in connection with FIG. 11C. For such embodiments, it may be possible to utilize the particle beam source 200, discussed above, in combination with two neutron generating targets. Such an arrangement is shown in FIG. 11D, where both Lithium and Beryllium neutron targets are provided and the particle beam can be directed to one or the other target (or alternated between the two) to promote the generation of thermal or fast neutrons, respectively.

FIGS. 11E and 11F illustrate still further alternate embodiments for generating fast and thermal neutrons. In the example of FIG. 11E a single neutron generating target is provided that includes upper segments 264 formed of Lithium and a lower core 266 formed of Beryllium. In this example, a particle beam of relatively high energy level particles and a beam shape in the form of a spot can be directed to the lower core to generate fast neutrons and a ring-shaped beam of a lower energy level can be directed to the upper segments to promote the generation of thermal neutrons.

In FIG. 11F a neutron generating target is provided in which a Beryllium core 272 is provided and Lithium is sputtered on to produce discrete regions 274 of Lithium containing material. In such an embodiment the surface areas of the target will include areas of both exposed Lithium and exposed Beryllium such that the provision of high energy particles will result in the production of fast and/or slow neutrons. In the example of FIG. 11F, the energy level of the incident particles can be adjusted to promote the generation of fast neutrons over thermal (e.g., by increasing the energy level of the incident particles above 4.5 MeV) or to promote the generation of thermal neutrons over fast neutrons (e.g., by maintaining the energy level of the particles comprising the particle beam between about 2.5 MeV and 3.5 MeV).

Figure 12:
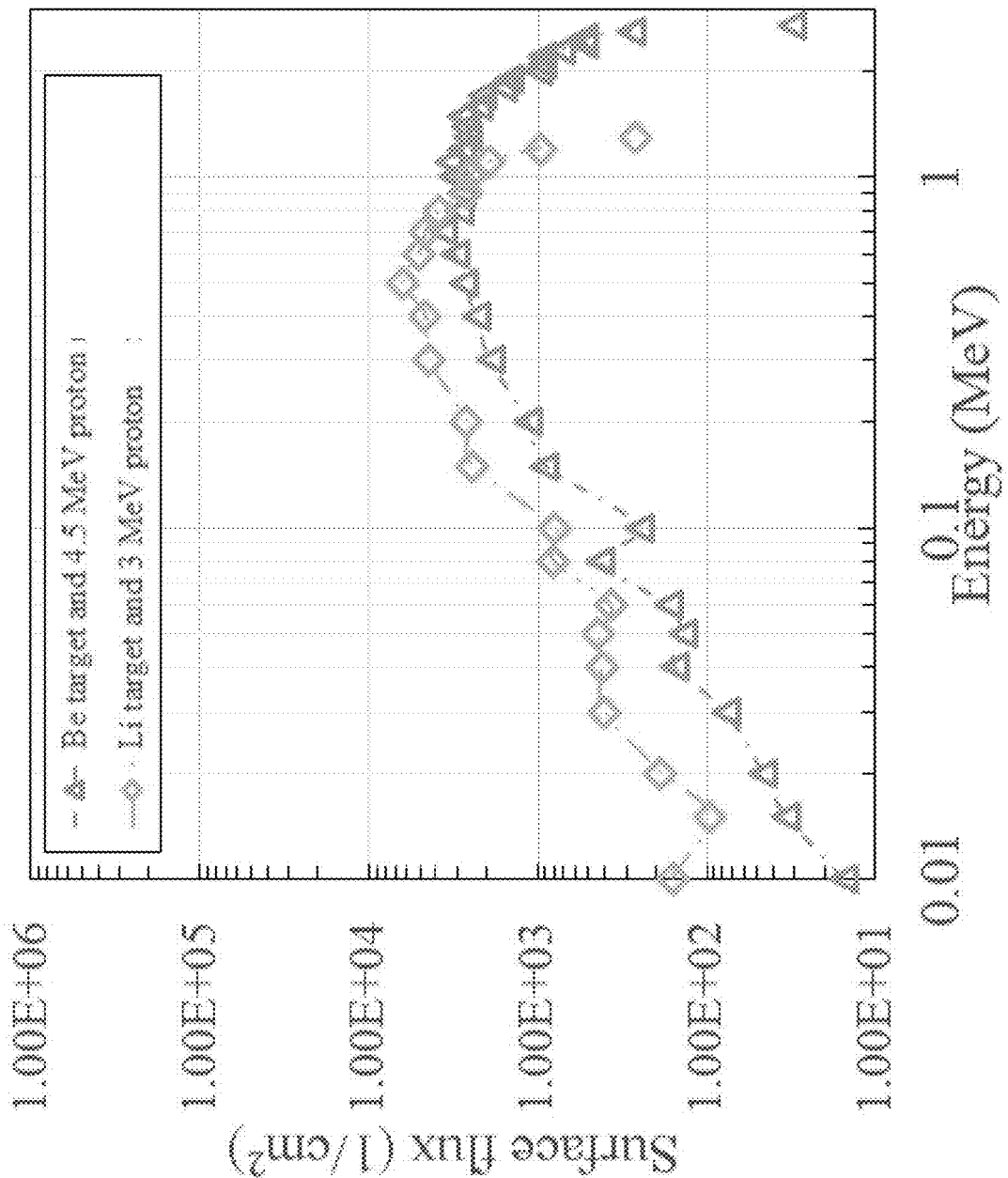
FIG. 12 generally illustrates the generated neutron flux levels and energy levels when neutron generating targets such as those illustrated in FIG. 11D are used and a Beryllium target is bombarded with protons having energy levels of at least approximately 4.5 MeV and a Lithium target is bombarded with protons having energy levels of at least approximately 3.0 MeV.

FIG. 12 generally illustrates the generated neutron flux levels and energy levels when neutron generating targets such as those illustrated in FIG. 11D are used: (a) a Beryllium target is bombarded with protons having energy levels of approximately 4.5 MeV (reflected by the triangles), and (b) a Lithium target is bombarded with approximately 3.0 MeV protons (reflected by the diamonds).

The Figures described above, and the written description of specific structures and functions below are not presented to limit the scope of what I have invented or the scope of the appended claims. Rather, the Figures and written description are provided to teach any person skilled in the art to make and use the inventions for which patent protection is sought.

Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Aspects of the inventions disclosed herein may be embodied as an apparatus, system, method, or computer program product. Accordingly, specific embodiments may take the form of an entirely hardware embodiment, an entirely software embodiment or an embodiment combining software and hardware aspects, such as a "circuit," "module" or "system." Furthermore, embodiments of the present inventions may take the form of a computer program product embodied in one or more computer readable storage media having computer readable program code.

Reference throughout this disclosure to "one embodiment," "an embodiment," or similar language means that a feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A Thorium fuel rod assembly comprising:
   first and second support elements; and
   a plurality of Thorium fuel rods positioned between the first and second support elements, each Thorium fuel rod comprising:
      an outer fuel element rod containing a solid Thorium-containing material wherein the outer fuel element:
         has a longitudinal length;
         defines an interior cavity extending along at least a majority of the longitudinal length of the outer fuel element rod; and
         defines a plurality of fins that project radially outwardly; and
      an inner core element formed from a Beryllium-containing material positioned within the interior cavity defined by the outer fuel element, wherein the inner core element:
         is generally tubular and has a longitudinal length greater than the longitudinal length of the outer fuel element rod such that at least a portion of the inner core element extends beyond a first end of the outer fuel element;
         defines an inner cavity extending along at least a majority of the longitudinal length of the inner core element;
      wherein the inner cavity of the Beryllium inner core element is configured to receive a beam of high energy particles and produce a (p,n) reaction resulting in the emission of a neutron; and
      wherein the outer fuel element rod is configured to receive the emitted neutron and cause fission of a Thorium nucleus in the outer fuel element rod.

2. The Thorium fuel rod assembly of claim 1 wherein the solid Thorium-containing material comprises metallic Thorium.

3. The Thorium fuel rod assembly of claim 1 wherein at least a plurality of the fins projecting radially from the plurality of fuel rods are configured to form a helical outer structure.

4. The Thorium fuel rod assembly of claim 1 wherein the inner core element extends along at least 75% of the length of the outer fuel element.

5. The Thorium fuel rod assembly of claim 1 wherein a shape of the inner cavity at any given radial cross section of the inner core element is a four-leaf clover.

6. The Thorium fuel rod assembly of claim 1 wherein wherein an inner surface of the inner core element includes spiral Beryllium projections along the longitudinal length of the inner core element.

7. The Thorium fuel rod assembly of claim 1 wherein the Thorium fuel rod assembly comprises at least five Thorium fuel rods, and wherein the at least five Thorium fuel rods are positioned between the first and second support elements such that one of the Thorium fuel rods is centrally positioned and the other four Thorium fuel rods are each located at the same radial distance from the centrally positioned Thorium fuel rod.

* * * * *